United States Patent
Shi et al.

(10) Patent No.: US 11,809,034 B2
(45) Date of Patent: Nov. 7, 2023

(54) DISPLAY SUBSTRATE, DISPLAY PANEL AND DISPLAY DEVICE

(71) Applicants: Chengdu BOE Optoelectronics Technology Co., Ltd., Chengdu (CN); BOE TECHNOLOGY GROUP CO., LTD., Beijing (CN)

(72) Inventors: Bo Shi, Beijing (CN); Bo Wu, Beijing (CN); Tianwen Hou, Beijing (CN); Lei Dai, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/977,310

(22) PCT Filed: Nov. 20, 2019

(86) PCT No.: PCT/CN2019/119727
§ 371 (c)(1),
(2) Date: Sep. 9, 2022

(87) PCT Pub. No.: WO2021/097715
PCT Pub. Date: May 27, 2021

(65) Prior Publication Data
US 2022/0404665 A1    Dec. 22, 2022

(51) Int. Cl.
*G02F 1/1339* (2006.01)
*G02F 1/1335* (2006.01)
*G02F 1/1343* (2006.01)

(52) U.S. Cl.
CPC .... *G02F 1/133514* (2013.01); *G02F 1/13394* (2013.01); *G02F 1/133512* (2013.01); *G02F 1/134336* (2013.01)

(58) Field of Classification Search
CPC ......... G02F 1/133514; G02F 1/133512; G02F 1/13394; G02F 1/13396
See application file for complete search history.

(56) References Cited

U.S. PATENT DOCUMENTS

| | | | | |
|---|---|---|---|---|
| 5,936,694 A | * | 8/1999 | Suzuki | G02F 1/134336 349/151 |
| 2004/0227873 A1 | * | 11/2004 | Peng | G02F 1/133512 349/106 |
| 2009/0009697 A1 | * | 1/2009 | Tsuji | G02F 1/133514 349/106 |

* cited by examiner

*Primary Examiner* — James A Dudek
(74) *Attorney, Agent, or Firm* — Collard & Roe, P.C.

(57) ABSTRACT

A display substrate and a display device are provided. The display substrate includes: a color filter layer including a display sub-pixel and a dummy sub-pixel and a spacer including a plurality of first spacers located in the periphery region and a plurality of second spacers located in the display region, the display sub-pixel is located in a display region and includes a first display sub-pixel, a second display sub-pixel, a third display sub-pixel, and a fourth display sub-pixel; the dummy sub-pixel is located in a periphery region the dummy sub-pixel is located in the dummy region of the periphery region, the dummy sub-pixel includes a first dummy sub-pixel, a second dummy sub-pixel, a third dummy sub-pixel, and a fourth dummy sub-pixel; an orthographic projection of the first spacer on the first base substrate has no overlap with an orthographic projection of the dummy sub-pixel on the first base substrate.

20 Claims, 16 Drawing Sheets

M12

DISPLAY SUBSTRATE, DISPLAY PANEL AND DISPLAY DEVICE

CROSS REFERENCE TO RELATED APPLICATIONS

This application is the National Stage of PCT/CN2019/119727 filed on Nov. 20, 2019, the disclosure of which is incorporated by reference.

TECHNICAL FIELD

At least one embodiment of the present disclosure relates to a display substrate, a display panel, and a display device.

BACKGROUND

Generally, a liquid crystal display device includes an array substrate and an opposed substrate, the array substrate and the opposed substrate are opposite to each other and are assembled to form a cell, a liquid crystal layer is disposed inside the cell, and the cell is provided with a spacer therein to support a cell gap. In order to facilitate an orientation of liquid crystal molecules, one side of the array substrate close to the liquid crystal layer and one side of the opposed substrate close to the liquid crystal layer are provided with an alignment layer, respectively. A color filter layer may be disposed on the array substrate or on the opposed substrate, and the substrate provided with the color filter layer may be referred to as a color filter substrate.

The liquid crystal display device includes a display region and a periphery region at least located at one side of the display region. The periphery region may be provided with a dummy sub-pixel to form a dummy region so as to facilitate improving a display quality.

SUMMARY

At least one embodiment of the present disclosure provides a display substrate, a display panel, and a display device.

At least one embodiment of the present disclosure provides a display substrate, including a color filter layer and a spacer; the color filter layer includes a display sub-pixel and a dummy sub-pixel, the display sub-pixel is located in a display region of a first base substrate, the display sub-pixel includes a first display sub-pixel, a second display sub-pixel, a third display sub-pixel, and a fourth display sub-pixel, colors of emitted light of the first display sub-pixel, the second display sub-pixel, the third display sub-pixel, and the fourth display sub-pixel are different from each other; the dummy sub-pixel is located in a periphery region of the first base substrate, the periphery region is at least located at one side of the display region, the periphery region includes a dummy region close to the display region and an edge region away from the display region, the dummy sub-pixel is located in the dummy region, the dummy sub-pixel includes a first dummy sub-pixel, a second dummy sub-pixel, a third dummy sub-pixel, and a fourth dummy sub-pixel, materials of the first dummy sub-pixel, the second dummy sub-pixel, the third dummy sub-pixel, and the fourth dummy sub-pixel are the same as materials of the first display sub-pixel, the second display sub-pixel, the third display sub-pixel, and the fourth display sub-pixel, respectively; the spacer includes a plurality of first spacers and a plurality of second spacers, the plurality of first spacers are located in the periphery region, the plurality of second spacers are located in the display region; an orthographic projection of each of the plurality of first spacers on the first base substrate has no overlap with an orthographic projection of the dummy sub-pixel on the first base substrate.

In one or more embodiment of the present disclosure, the dummy region includes a blank sub-pixel, the color filter layer is hollowed-out at a position of the blank sub-pixel, the dummy region includes a first dummy sub-region and a second dummy sub-region located at two opposite sides of the display region, respectively, the blank sub-pixel includes a first blank sub-pixel located in the first dummy sub-region and a second blank sub-pixel located in the second dummy sub-region, the first blank sub-pixel and the second blank sub-pixel are located in different rows.

In one or more embodiment of the present disclosure, one of the first blank sub-pixel and the second blank sub-pixel is located in an even-numbered row, and the other one of the first blank sub-pixel and the second blank sub-pixel is located in an odd-numbered row.

In one or more embodiment of the present disclosure, the plurality of first spacers are only located in the edge region; or, the plurality of first spacers are located in the dummy region and in the edge region, an orthographic projection of the first spacer located in the dummy region on the first base substrate has an overlap with an orthographic projection of the blank sub-pixel on the first base substrate.

In one or more embodiment of the present disclosure, the display substrate further includes a black matrix and a light-shielding layer, the black matrix and the light-shielding layer are located on the first base substrate, the black matrix is located in the display region, the light-shielding layer is located in the periphery region, an orthographic projection of the first spacer on the first base substrate is located within an orthographic projection of the light-shielding layer on the first base substrate, and an orthographic projection of the second spacer on the first base substrate is located within an orthographic projection of the black matrix on the first base substrate.

In one or more embodiment of the present disclosure, each of the first dummy sub-region and the second dummy sub-region includes two columns of dummy sub-pixels; in the first dummy sub-region, one of an odd-numbered row and an even-numbered row includes one first dummy sub-pixel and one second dummy sub-pixel, and the other one of the odd-numbered row and the even-numbered row includes two blank sub-pixels; in the second dummy sub-region, one of an odd-numbered row and an even-numbered row includes one third dummy sub-pixel and one fourth dummy sub-pixel, and the other one of the odd-numbered row and the even-numbered row includes two blank sub-pixels.

In one or more embodiment of the present disclosure, the first display sub-pixel, the second display sub-pixel, the third display sub-pixel, and the fourth display sub-pixel are arranged sequentially in a first direction and constitute one pixel, two pixels adjacent in a second direction are staggered in the first direction by a distance of two display sub-pixels, the first direction is intersected with the second direction.

In one or more embodiment of the present disclosure, the edge region includes a blank region sub-pixel, the color filter layer is hollowed-out at a position of the blank region sub-pixel; the second spacer located in the display region and the first spacer located in the edge region at one side of the display region are spaced apart by three display sub-pixels.

In one or more embodiment of the present disclosure, each of the first dummy sub-region and the second dummy sub-region includes three columns of dummy sub-pixels; in the first dummy sub-region, one of an odd-numbered row and an even-numbered row includes one first dummy sub-pixel, one second dummy sub-pixel, and one third dummy sub-pixel, and the other one of the odd-numbered row and the even-numbered row includes one fourth dummy sub-pixel and two blank sub-pixels; in the second dummy sub-region, one of an odd-numbered row and an even-numbered row includes one third dummy sub-pixel and two fourth dummy sub-pixels, and the other one of the odd-numbered row and the even-numbered row includes one fourth dummy sub-pixel and two blank sub-pixels.

In one or more embodiment of the present disclosure, each of the first dummy sub-region and the second dummy sub-region includes five columns of dummy sub-pixels; in the first dummy sub-region, one of an odd-numbered row and an even-numbered row includes two first dummy sub-pixels, one second dummy sub-pixel, one third dummy sub-pixel, and one fourth dummy sub-pixel, and the other one of the odd-numbered row and the even-numbered row includes one first dummy sub-pixel, one second dummy sub-pixel, one third dummy sub-pixel, and two blank sub-pixels; in the second dummy sub-region, one of an odd-numbered row and an even-numbered row includes one first dummy sub-pixel, one second dummy sub-pixel, one third dummy sub-pixel, and two fourth dummy sub-pixels, and the other one of the odd-numbered row and the even-numbered row includes one first dummy sub-pixel, one second dummy sub-pixel, one third dummy sub-pixel and two blank sub-pixels.

In one or more embodiment of the present disclosure, each of the first dummy sub-region and the second dummy sub-region includes six columns of dummy sub-pixels; in the first dummy sub-region, one of an odd-numbered row and an even-numbered row includes one first dummy sub-pixel, one second dummy sub-pixel, one third dummy sub-pixel, and three fourth dummy sub-pixels, and the other one of the odd-numbered row and the even-numbered row includes one first dummy sub-pixel, one second dummy sub-pixel, two fourth dummy sub-pixels, and two blank sub-pixels; in the second dummy sub-region, one of an odd-numbered row and an even-numbered row includes one first dummy sub-pixel, one second dummy sub-pixel, one third dummy sub-pixel, and three fourth dummy sub-pixels, and the other one of the odd-numbered row and the even-numbered row includes one third dummy sub-pixel, three fourth dummy sub-pixels, and two blank sub-pixels.

In one or more embodiment of the present disclosure, the first spacer and the second spacer have a same size in a direction perpendicular to the first base substrate, a distance from a surface of the first spacer away from the first base substrate to the first base substrate is smaller than a distance from a surface of the second spacer away from the first base substrate to the first base substrate.

In one or more embodiment of the present disclosure, the display substrate further includes an optical clear adhesive layer located on the first base substrate, the optical clear adhesive layer covers the display sub-pixel and the dummy sub-pixel.

In one or more embodiment of the present disclosure, the display substrate further includes a first alignment layer located on the first base substrate, the first alignment layer covers the display sub-pixel and the dummy sub-pixel.

In one or more embodiment of the present disclosure, the first display sub-pixel includes a red sub-pixel, the second display sub-pixel includes a green sub-pixel, the third display sub-pixel includes a blue sub-pixel, and the fourth display sub-pixel includes a white sub-pixel.

At least one embodiment of the present disclosure further provides a display panel, including the display substrate described in any of the above.

In one or more embodiment of the present disclosure, the display panel further includes an array substrate, the array substrate includes a plurality of pixel electrodes, and the orthographic projection of the dummy sub-pixel on the first base substrate has no overlap with orthographic projections of the plurality of pixel electrodes on the first base substrate.

In one or more embodiment of the present disclosure, an orthographic projection of the display sub-pixel on the first base substrate has an overlap with an orthographic projection of one pixel electrode of the plurality of pixel electrodes on the first base substrate.

In one or more embodiment of the present disclosure, a gap is provided between the first spacer and the array substrate.

In one or more embodiment of the present disclosure, the second spacer is in contact with the array substrate.

At least one embodiment of the present disclosure further provides a display device, including the display panel described in any of the above.

BRIEF DESCRIPTION OF THE DRAWINGS

In order to more clearly explain the technical solution(s) in the embodiments of the present disclosure, the drawings of the embodiments will be briefly introduced in the following. Apparently, the described drawings in the following are only related to some embodiments of the present disclosure without any limitation to the present disclosure.

DETAILED DESCRIPTION

Figure 1:
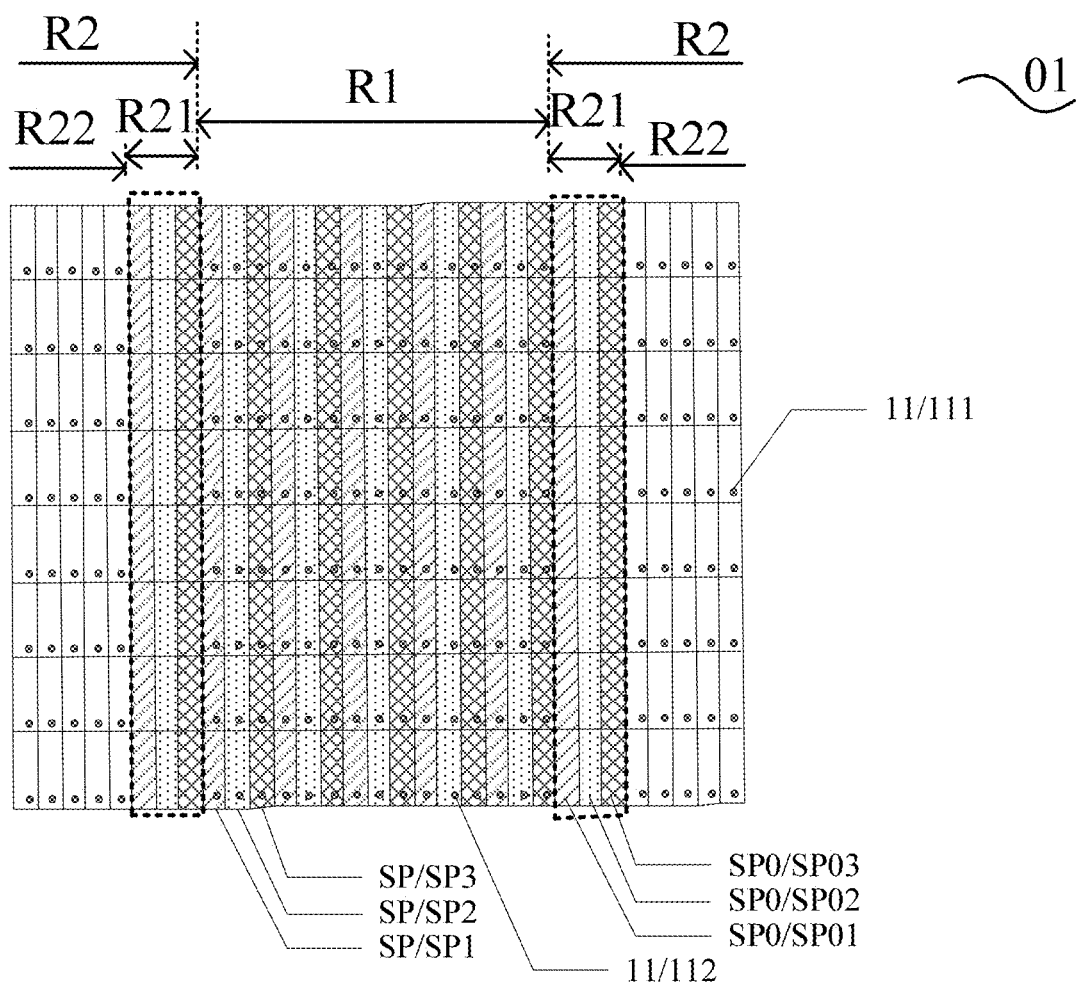
FIG. 1 is a plan view of a display substrate provided by an embodiment of the present disclosure.

In order to make objectives, technical details and advantages of the embodiments of the present disclosure more clearly, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the described object is changed, the relative position relationship may be changed accordingly.

In order to prevent from the problem such as light leakage, usually, a shielding layer is provided in the periphery region of the display device. The shielding layer and black matrixes disposed in the display region may be formed from the same film layer by the same process. The light-shielding layer usually covers the entire periphery region, while black matrixes in the display region are arranged in a form of matrix. For example, the black matrixes in the display region only are provided at positions of data lines and gate lines. In this way, a film layer in the dummy region, for example, a resin layer for forming a dummy color filter has a relatively larger thickness, which is liable to make an excessively greater cell gap and hence leads to the problem of side Mura. The problem of side Mura includes side yellowing, which affects the display quality.

The liquid crystal display device includes a plurality of pixels, and each of the plurality of pixels includes a plurality of sub-pixels. For example, one pixel includes a plurality of sub-pixels of different colors. For example, one pixel includes a red sub-pixel, a green sub-pixel and a blue sub-pixel, without limited thereto. The number of sub-pixels included in one pixel and the color of each of the sub-pixels may be determined depending on demands. For example, one pixel includes a red sub-pixel, a green sub-pixel, a blue sub-pixel, and a white sub-pixel. The number of the white sub-pixel included in one pixel may be determined depending on demands.

In order to lower the cost of development of products, the color filter layer of the liquid crystal display device usually is manufactured by adopting a method in which sub-pixels of different colors share one mask.

FIG. 1 is a plan view of a display substrate provided by an embodiment of the present disclosure. As illustrated in FIG. 1, the display substrate 01 includes a display region R1 and a periphery region R2; the periphery region R2 includes a dummy region R21 close to the display region R1 and an edge region R22 away from the display region R1. A display sub-pixel SP is provided in the display region R1, and the display sub-pixel SP includes a first display sub-pixel SP1, a second display sub-pixel SP2, and a third display sub-pixel SP3. A dummy sub-pixel SP is provided in the dummy region R21, and the dummy sub-pixel SP includes a first dummy sub-pixel SP01, a second dummy sub-pixel SP02, and a third dummy sub-pixel SP03. By providing the dummy sub-pixel SP, it can facilitate improving the image quality of the display sub-pixel in the display region R1, and can facilitate a transition from the display region R1 to the dummy region R21 during coating an alignment layer, so that the orientation of the liquid crystal molecules is more ordered, thereby facilitating the improvement of display quality at edge positions of the display region.

The first display sub-pixel SP1, the second display sub-pixel SP2 and the third display sub-pixel SP3 may be formed by using the same mask. The first display sub-pixel SP1, the second display sub-pixel SP2 and the third display sub-pixel SP3 are located in the display region R1. Moreover, forming the first dummy sub-pixel SP01 located in the dummy region R21 at the same time when forming the first display sub-pixel SP1; forming the second dummy sub-pixel SP02 located in the dummy region R21 at the same time when forming the second display sub-pixel SP2; and forming the third dummy sub-pixel SP03 located in the dummy region R21 at the same time when forming the third display sub-pixel SP3. For example, the first display sub-pixel SP1 is a red sub-pixel, the second display sub-pixel SP2 is a green sub-pixel, and the third display sub-pixel SP3 is a blue sub-pixel.

As illustrated in FIG. 1, the display substrate further includes a spacer 11. The spacer 11 includes a first spacer 111 located in the periphery region R2 and a second spacer 112 located in the display region R1. The first spacer 111 and the second spacer 112 may be formed by using the same mask. For example, as illustrated in FIG. 1, the first spacer 111 is only disposed in the edge region R22. The first spacer 111 is not disposed in the dummy region R21.

As illustrated in FIG. 1, the region provided with the dummy sub-pixel SP0 is not provided with the first spacer 111, and the first spacer 111 is distributed in the edge region R22, so as to avoid the occurrence of defects such as side yellowing due to an excessively larger cell gap at an area in the periphery region close to the display region caused by an overlap between the dummy sub-pixel SP0 and the first spacer 111.

As illustrated in FIG. 1, in order to prevent from an excessively larger cell gap at the dummy region R21, the dummy region R21 is not provided with the spacer so as to prevent from the defect of side Mura. For example, the spacer 11 and the dummy sub-pixel SP0 have no overlap there-between. For example, the spacer 11 has no overlap with any of the first dummy sub-pixel SP01, the second dummy sub-pixel SP02, and the third dummy sub-pixel SP03. Further, the first spacer 111 and the dummy sub-pixel SP0 have no overlap there-between. For example, the first spacer 111 has no overlap with any of the first dummy sub-pixel SP01, the second dummy sub-pixel SP02 and the third dummy sub-pixel SP03.

Figure 2:
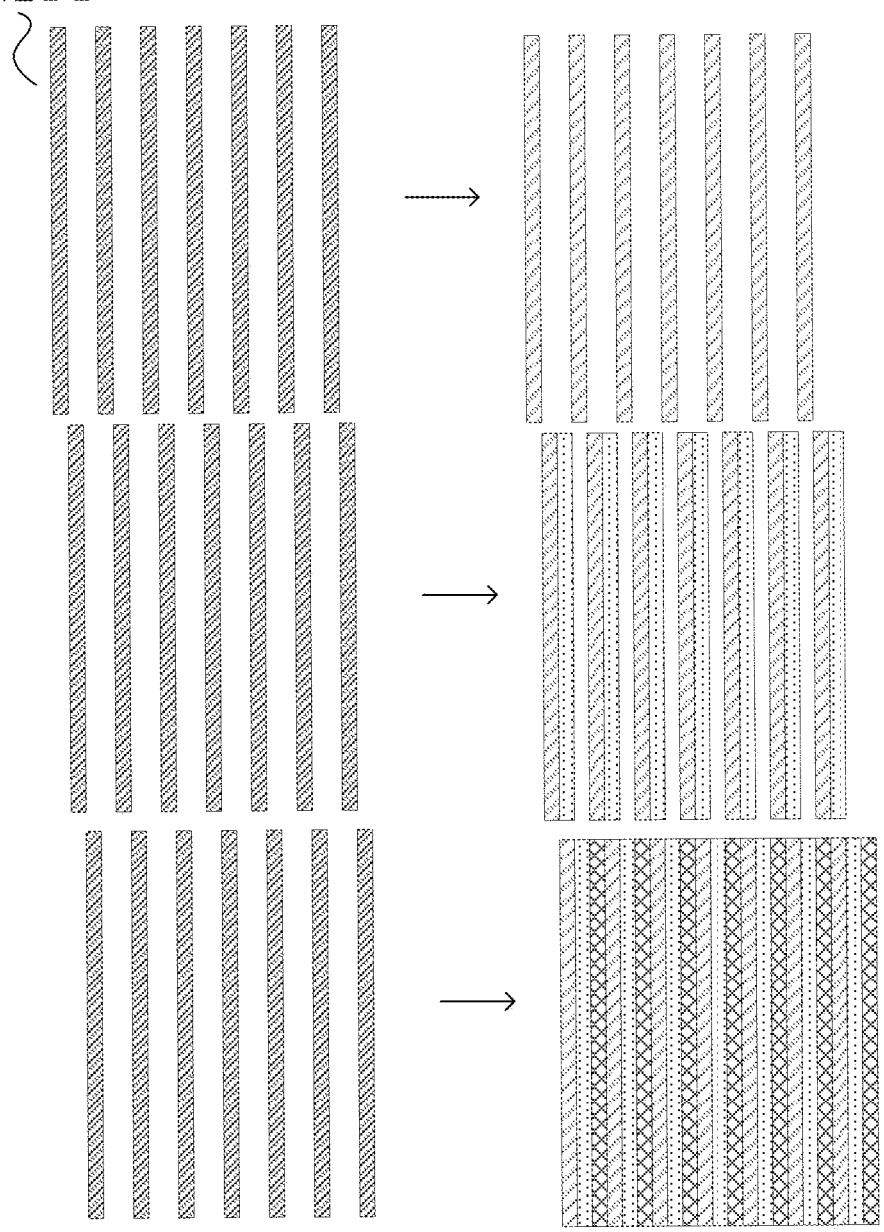
FIG. 2 is a schematic diagram of a mask for forming a sub-pixel illustrated in FIG. 1, as provided by an embodiment of the present disclosure.

FIG. 2 is a schematic diagram of a mask for forming a sub-pixel illustrated in FIG. 1 as provided by an embodiment of the present disclosure. The sub-pixel includes a display sub-pixel SP and a dummy sub-pixel SP0. The mask M11 illustrated in FIG. 2 may be used for three different patterning processes to form the first display sub-pixel SP1, the second display sub-pixel SP2, and the third display sub-pixel SP3 in the display substrate illustrated in FIG. 1, respectively. Furthermore, forming the first dummy sub-pixel SP01 at the same time when forming the first display sub-pixel SP1; forming the second dummy sub-pixel SP02 at the same time when forming the second display sub-pixel SP2; and forming the third dummy sub-pixel SP03 at the same time when forming the third display sub-pixel SP3.

An embodiment of the present disclosure is described with reference to the case where the first display sub-pixel SP1 is a red sub-pixel, the second display sub-pixel SP2 is a green sub-pixel, and the third display sub-pixel SP3 is a blue sub-pixel, by way of example. The step of forming the color filter layer includes: forming a first display sub-pixel SP1 and a first dummy sub-pixel SP01 (e.g., a red display sub-pixel and a red dummy sub-pixel) in a first patterning process by using a mask; shifting the mask to the right by a distance of one sub-pixel, and forming a second display sub-pixel SP2 and a second dummy sub-pixel SP02 (e.g., a green display sub-pixel and a green dummy sub-pixel) in a second patterning process by using the mask described above; shifting the mask to the right, again, by a distance of one sub-pixel, and forming a third display sub-pixel SP3 and a third dummy sub-pixel SP03 (e.g., a blue display sub-pixel and a blue dummy sub-pixel) in a third patterning process by using the mask described above. As illustrated in FIG. 1, finally, three columns of dummy sub-pixels are formed at each of two opposite sides of the display region, and the three columns of dummy sub-pixels include one column of first dummy sub-pixels SP01, one column of second dummy sub-pixels SP02, and one column of third dummy sub-pixels SP03.

Further, the step of forming the color filter layer includes: forming a first film, and patterning the first film by using a mask to form a first display sub-pixel SP1 and a first dummy sub-pixel SP01 (e.g., a red display sub-pixel and a red dummy sub-pixel); forming a second film, shifting the mask to the right by a distance of one sub-pixel, and patterning the second film by using the mask described above to form a second display sub-pixel SP2 and a second dummy sub-pixel SP02 (e.g., a green display sub-pixel and a green dummy sub-pixel); forming a third film, shifting the mask to the right, again, by a distance of one sub-pixel, and patterning the third film by using the mask described above to form a third display sub-pixel SP3 and a third dummy sub-pixel SP03 (e.g., a blue display sub-pixel and a blue dummy sub-pixel); finally, three columns of dummy sub-pixels are formed at each of two opposite sides of the display region. The first film, the second film, and the third film may be fabricated by using a photoresist. By fabricating the first display sub-pixel SP1, the second dummy sub-pixel SP02, and the third display sub-pixel SP3 by sharing the same mask, it facilitates lowering the cost.

Figure 3:
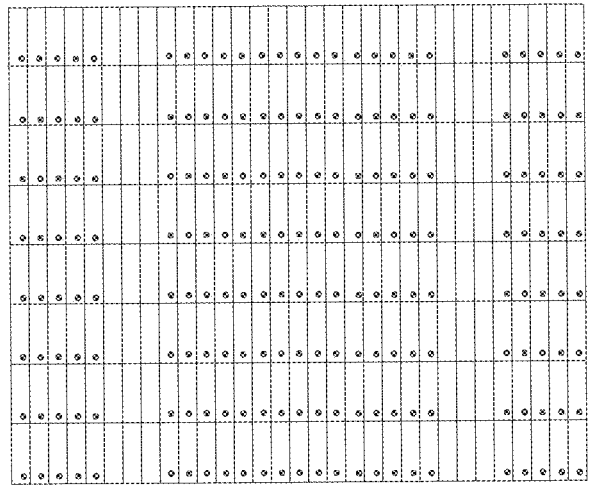
FIG. 3 is a schematic diagram of a mask for forming a spacer illustrated in FIG. 1, as provided by an embodiment of the present disclosure.

FIG. 3 is a schematic diagram of a mask for forming a spacer illustrated in FIG. 1 as provided by an embodiment of the present disclosure. As illustrated in FIG. 3, the mask M12 is used for forming the spacer 11 illustrated in FIG. 1.

However, for a display mode including a white sub-pixel, for example, RGBW display mode, because the critical dimension bias (CD bias) of the photoresist for fabricating the white sub-pixel is different from the CD bias of the photoresist for fabricating R, G or B, only the W sub-pixel uses a different mask, alone. Because RGB display mode involves an island pattern design instead of a conventional stripe pattern design, if the mask for forming the R sub-pixel is shifted to the right to fabricate the G sub-pixel and the B sub-pixel, a situation would occur that two dummy sub-pixel are excessive in every other row. Under the circumstance that the mask for fabricating the spacer remains unchanged, it may result in an overlap between the first spacer 111 and the dummy sub-pixel SP0, so that the cell gap at the periphery of the panel is relatively greater, and the problem of side Mura would occur.

Figure 4:
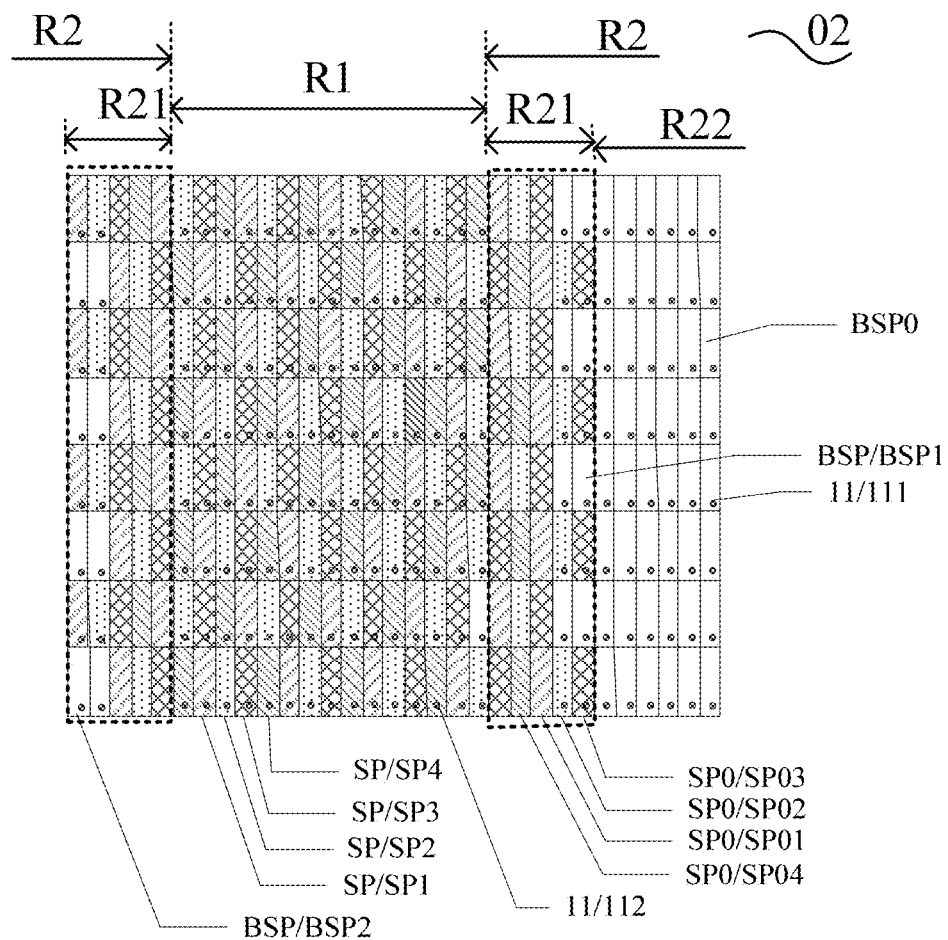
FIG. 4 is a plan view of a display substrate of RGBW display mode.

FIG. 4 is a plan view of a display substrate of RGBW display mode. As illustrated in FIG. 4, the display panel 02 includes a display region R1 and a periphery region R2; the periphery region R2 includes a dummy region R21 close to the display region R1 and an edge region R22 away from the display region R1. The display region R1 further includes a fourth display sub-pixel SP4, the dummy region R21 includes a fourth dummy sub-pixel SP04. For example, the fourth display sub-pixel SP4 is a white sub-pixel, and the fourth dummy sub-pixel SP04 is a white sub-pixel. The fourth display sub-pixel SP4 and the fourth dummy sub-pixel SP04 may be fabricated by using the same mask from the same film layer. For example, the first display sub-pixel SP1 is a red sub-pixel, the second display sub-pixel SP2 is a green sub-pixel, the third display sub-pixel SP3 is a blue sub-pixel, and the fourth display sub-pixel SP4 is a white sub-pixel, without limited thereto.

As illustrated in FIG. 4, the dummy region R21 at each of two sides of the display region R1 is provided with five columns of dummy sub-pixel SP0; and in the dummy region R21, part of the dummy sub-pixels SP0 have an overlap with the first spacer 111. In this way, the display substrate 02 illustrated in FIG. 2 involves the problem that the cell gap at the periphery region is relatively greater, which easily results in the problem of side Mura.

Figure 5:
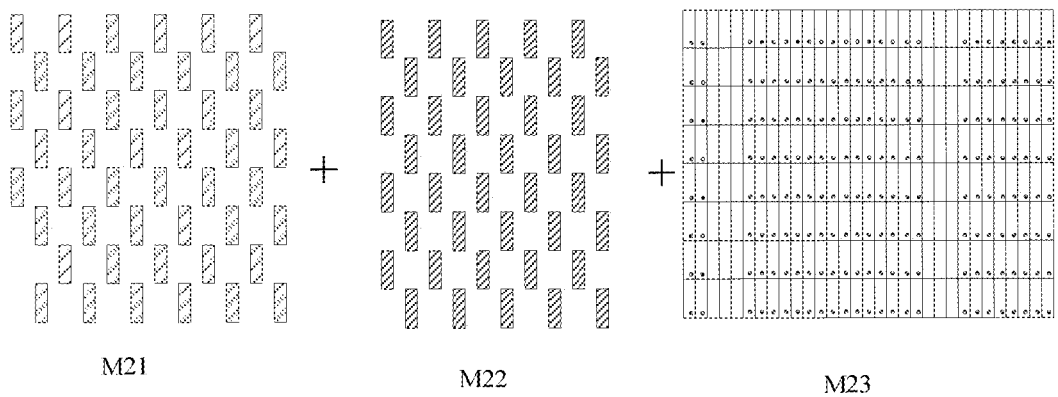
FIG. 5 is a schematic diagram of a mask for forming the display substrate of RGBW display mode illustrated in FIG. 4.

FIG. 5 is a schematic diagram of a mask for forming the display substrate of RGBW display mode as illustrated in FIG. 4. FIG. 5 illustrates a first mask M21, a second mask M22, and a third mask M23. The first display sub-pixel SP1 and the first dummy sub-pixel SP01, the second display sub-pixel SP2 and the second dummy sub-pixel SP02, the third display sub-pixel SP3 and the third dummy sub-pixel SP03 are formed by using the first mask 21 in a manner of translationally shifting the mask M21. The fourth display sub-pixel SP4 and the fourth dummy sub-pixel SP04 are formed by using the second mask M22. The spacer 11 is formed by using the third mask M23.

Figure 6:
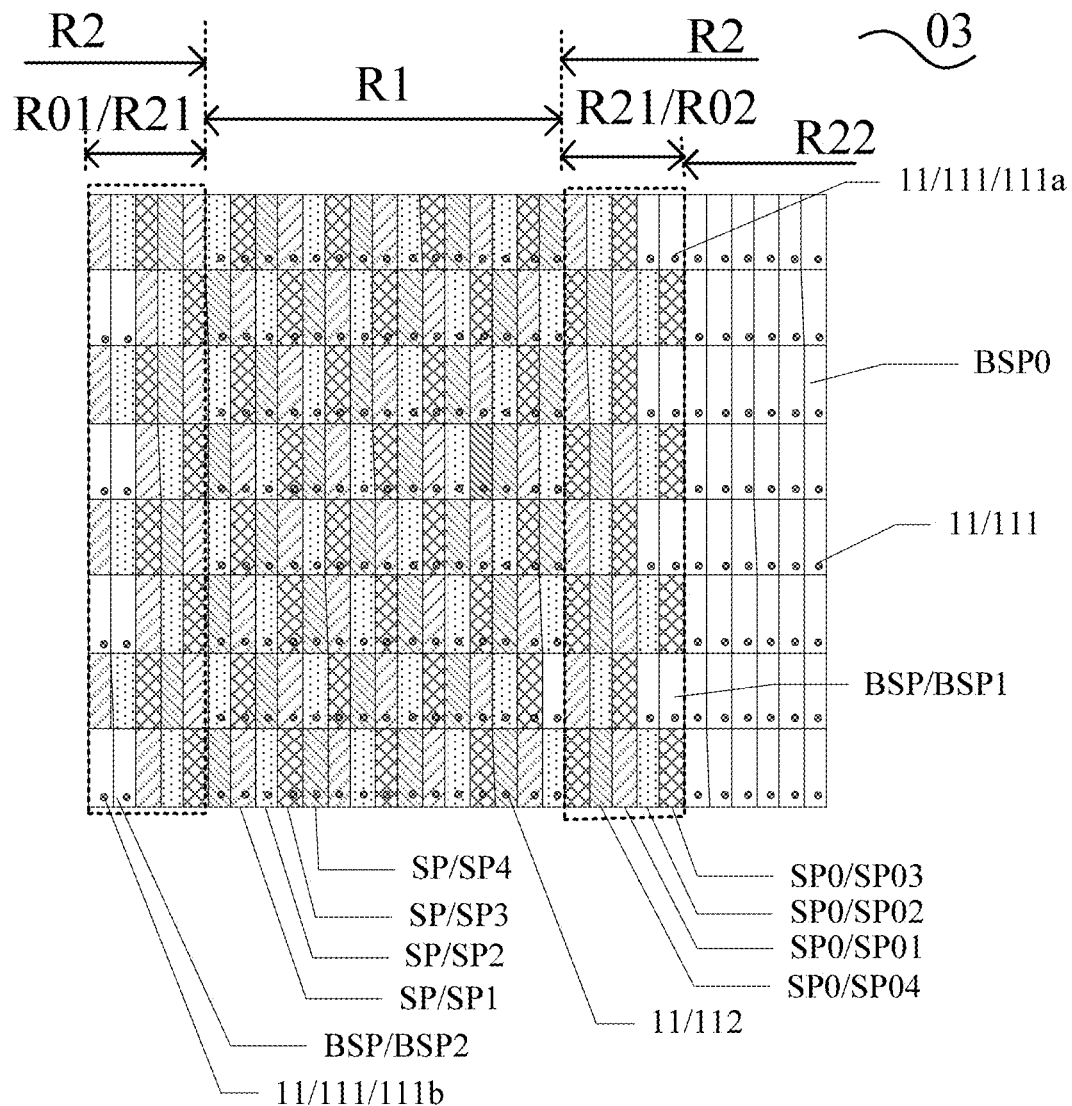
FIG. 6 is a plan view of a display substrate provided by an embodiment of the present disclosure.

FIG. 6 is a plan view of a display substrate provided by an embodiment of the present disclosure. Compared with the display substrate 02 illustrated in FIG. 4, in the display substrate 03 illustrated in FIG. 6, the first spacer in the dummy region R21 that has an overlap with the dummy sub-pixel SP0 is removed; in this way, as illustrated in FIG. 6, the spacer 11 has no overlap with the dummy sub-pixel SP0. Further, in the dummy region R21, the dummy sub-pixel SP0 has no overlap with the first spacer 111. That is, as illustrated in FIG. 6, a plurality of first spacers 11 is located in the dummy region R21 and in the edge region R22, and the plurality of first spacers 11 have no overlap with the dummy sub-pixel SP0. That is, the plurality of first spacers 11 have no overlap with any of the first dummy sub-pixel SP01, the second dummy sub-pixel SP02, the third dummy sub-pixel SP03, and the fourth dummy sub-pixel SP04.

As illustrated in FIG. 6, the dummy region R21 at each of two sides of the display region R1 includes five columns of dummy sub-pixels; in the dummy region R21, the first spacer 111 includes a spacer 111a of first type and a spacer 111b of second type; one of the spacer 111a of first type and the spacer 111b of second type is located in an even-numbered row, and the other one of the spacer 111a of first type and the spacer 111b of second type is located in an odd-numbered row; FIG. 6 illustrates the case where the spacer 111a of first type is located in the odd-numbered row and the spacer 111b of second type is located in the even-numbered row, by way of example. The spacer 111a of first type and the spacer 111b of second type are located in different rows. For example, the spacer 111a of first type and the spacer 111b of second type are located in adjacent rows.

For example, as illustrated in FIG. 6, the dummy region R21 further includes a blank sub-pixel BSP. The blank sub-pixel BSP in the dummy region R21 has an overlap with the first spacer 111 located in the dummy region R21. As illustrated in FIG. 6, the dummy region R21 includes a first blank sub-pixel BSP1 located in an odd-numbered row and a second blank sub-pixel BSP2 located in an even-numbered row.

For example, as illustrated in FIG. 6, in the dummy region R21 at one side (right side) of the display region R1, two first blank sub-pixels BSP1 located in an odd-numbered row are farther from the display region R1 than the dummy sub-pixel SP0 in the row where the two first blank sub-pixels BSP1 are located; and in two columns of dummy sub-pixels farthest from the display region R1, the second dummy sub-pixel SP02 and the third dummy sub-pixel SP03 are located in an even-numbered row; in one of the two columns of dummy sub-pixels farthest from the display region R1, a plurality of second dummy sub-pixels SP02 are arranged alternately with a plurality of first blank sub-pixels BSP1, in the other one of the two columns of dummy sub-pixels farthest from the display region R1, a plurality of third dummy sub-pixels SP03 are arranged alternately with a plurality of first blank sub-pixels BSP1.

For example, as illustrated in FIG. 6, in the dummy region R21 at one side (left side) of the display region R1, two second blank sub-pixels BSP2 located in an even-numbered row are farther from the display region R1 than the dummy sub-pixel SP0 in the row where the two second blank sub-pixels BSP2 are located; and in two columns of dummy sub-pixels farthest from the display region R1, the first dummy sub-pixel SP01 and the second dummy sub-pixel SP02 are located in an odd-numbered row; in one of the two columns of dummy sub-pixels farthest from the display region R1, a plurality of first dummy sub-pixels SP01 are arranged alternately with a plurality of second blank sub-pixels BSP2, in the other one of the two columns of dummy sub-pixels farthest from the display region R1, a plurality of second dummy sub-pixels SP02 are arranged alternately with a plurality of second blank sub-pixels BSP2.

Figure 7:
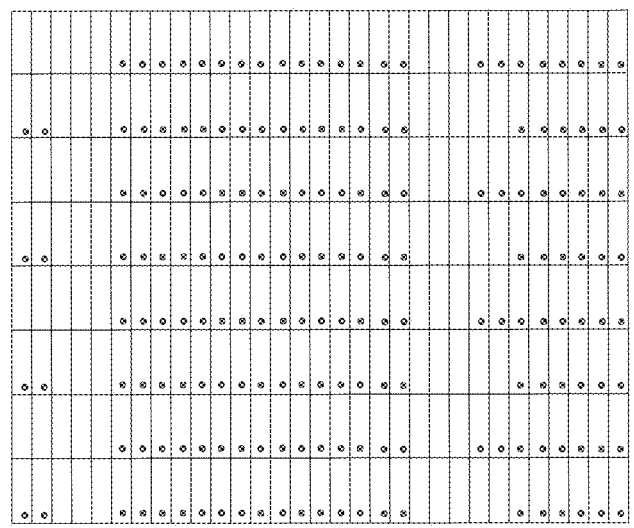
FIG. 7 is a schematic diagram of a mask for forming a spacer in the display substrate illustrated in FIG. 6, as provided by an embodiment of the present disclosure.

FIG. 7 is a schematic diagram of a mask for forming a spacer in the display substrate as illustrated in FIG. 6. The mask M230 illustrated in FIG. 7 is utilized to replace the third mask M23 illustrated in FIG. 5, that is, the display substrate illustrated in FIG. 6 may be formed by using the first mask M21, the second mask M22, and the mask M230. Forming the display substrate 03 illustrated in FIG. 6 needs to replace the mask for forming the spacer but does not need to replace the masks for forming the display sub-pixel and the dummy sub-pixel; that is, it has no need of replacing the first mask M21 and the second mask M22.

Figure 8A:
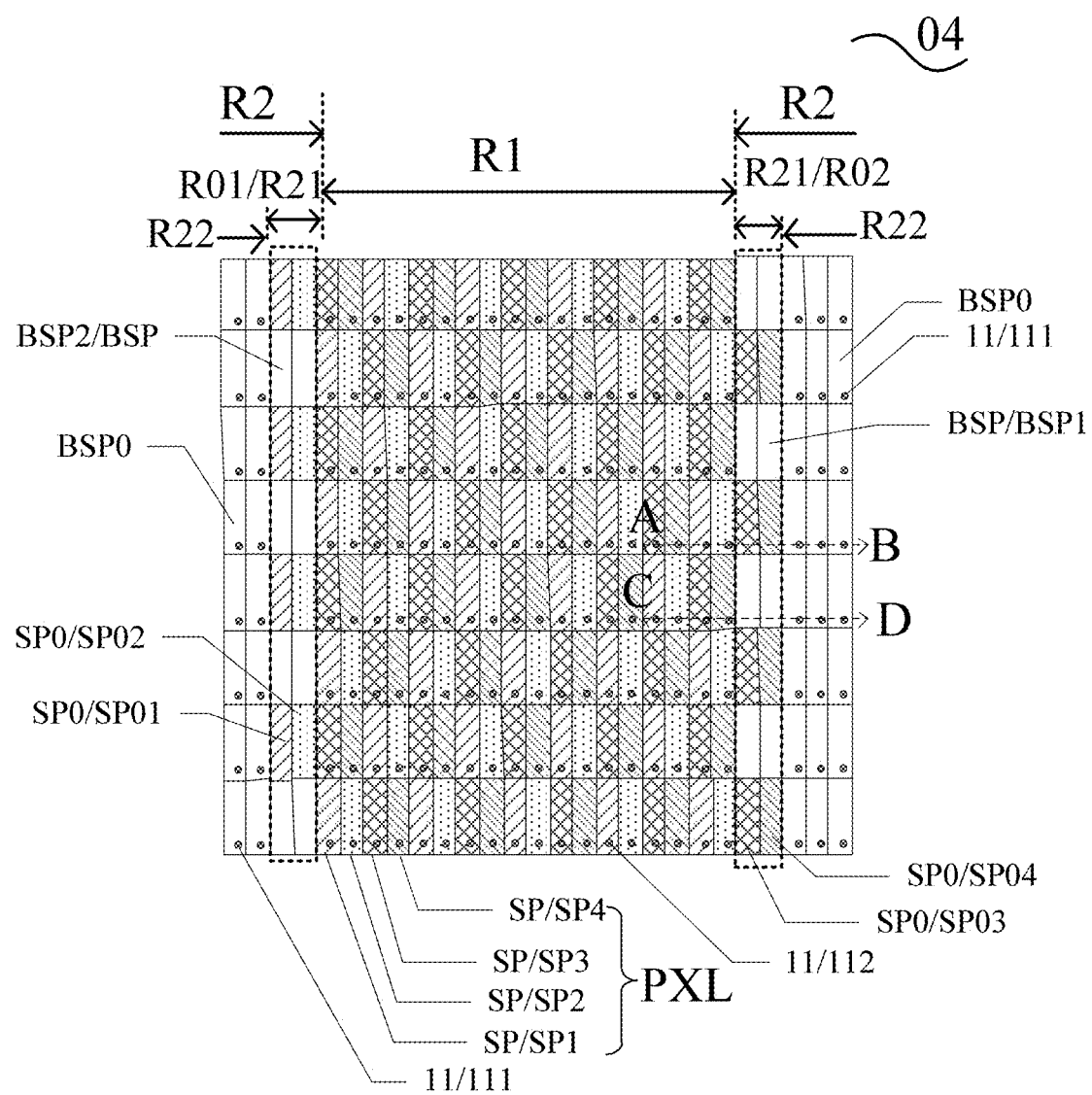
FIG. 8A is a plan view of a display substrate provided by an embodiment of the present disclosure.

FIG. 8A is a plan view of a display substrate provided by an embodiment of the present disclosure. As illustrated in FIG. 8A, the display panel 04 includes a display region R1 and a periphery region R2; the periphery region R2 is at least located at one side of the display region R1. As illustrated in FIG. 8A, the periphery region R2 is located at two opposite sides of the display region R2. As illustrated in FIG. 8A, the periphery region R2 includes a dummy region R21 close to the display region R1 and an edge region R22 away from the display region R1. The display region R1 includes a first display sub-pixel SP1, a second display sub-pixel SP2, a third display sub-pixel SP3, and a fourth display sub-pixel SP4. For example, the first display sub-pixel SP1 is a red sub-pixel, the second display sub-pixel SP2 is a green sub-pixel, the third display sub-pixel SP3 is a blue sub-pixel, and the fourth display sub-pixel SP4 is a white sub-pixel, without limited thereto.

As illustrated in the left side of FIG. 8A, the dummy region R21 at one side of the display region R1 has two columns of dummy sub-pixels SP0; a first dummy sub-pixel SP01 and a second dummy sub-pixel SP02 are located in the dummy region R21. As illustrated in the left side of FIG. 8A, a blank sub-pixel BSP is located in the dummy region R21; in the dummy region R21, an odd-numbered row includes the first dummy sub-pixel SP01 and the second dummy sub-pixel SP02, and an even-numbered row includes two adjacent blank sub-pixels BSP. As illustrated in the left side of FIG. 8A, in one column of dummy sub-pixels, a plurality of blank sub-pixels BSP are arranged alternately with a plurality of first dummy sub-pixels SP01; and in the other column of dummy sub-pixels, a plurality of blank sub-pixels BSP are arranged alternately with a plurality of second dummy sub-pixels SP02.

As illustrated in the right side of FIG. 8A, the dummy region R21 at the other side of the display region R1 has two columns of dummy sub-pixels SP0. As illustrated in the right side of FIG. 8A, a third dummy sub-pixel SP03 and a fourth dummy sub-pixel SP04 are located in the dummy region R21. As illustrated in the right side of FIG. 8A, an odd-numbered row includes two adjacent blank sub-pixels BSP, and an even-numbered row includes the third dummy sub-pixel SP03 and the fourth dummy sub-pixel SP04. As illustrated in the right side of FIG. 8A, in the dummy region R21, in one column of dummy sub-pixels close to the display region R1, a plurality of blank sub-pixels BSP are alternately arranged with a plurality of third dummy sub-pixels SP03; in one column of dummy sub-pixels away from the display region R1, a plurality of blank sub-pixels BSP are alternately arranged with a plurality of fourth dummy sub-pixels SP04. As illustrated in FIG. 8A, the blank sub-pixel BSP (the second blank sub-pixel BSP2) in the dummy region R21 at the left side of the display region R1 and the blank sub-pixel BSP (the first blank sub-pixel BSP1) in the dummy region R21 at the right side of the display region R1 are located in different rows. As illustrated in FIG. 8A, the second blank sub-pixel BSP2 is located in an even-numbered row, and the first blank sub-pixel BSP1 is located in an odd-numbered row. Two columns of dummy sub-pixels SP0 facilitate narrowing the bezel and facilitate supporting the cell gap by the spacer.

Figure 8B:
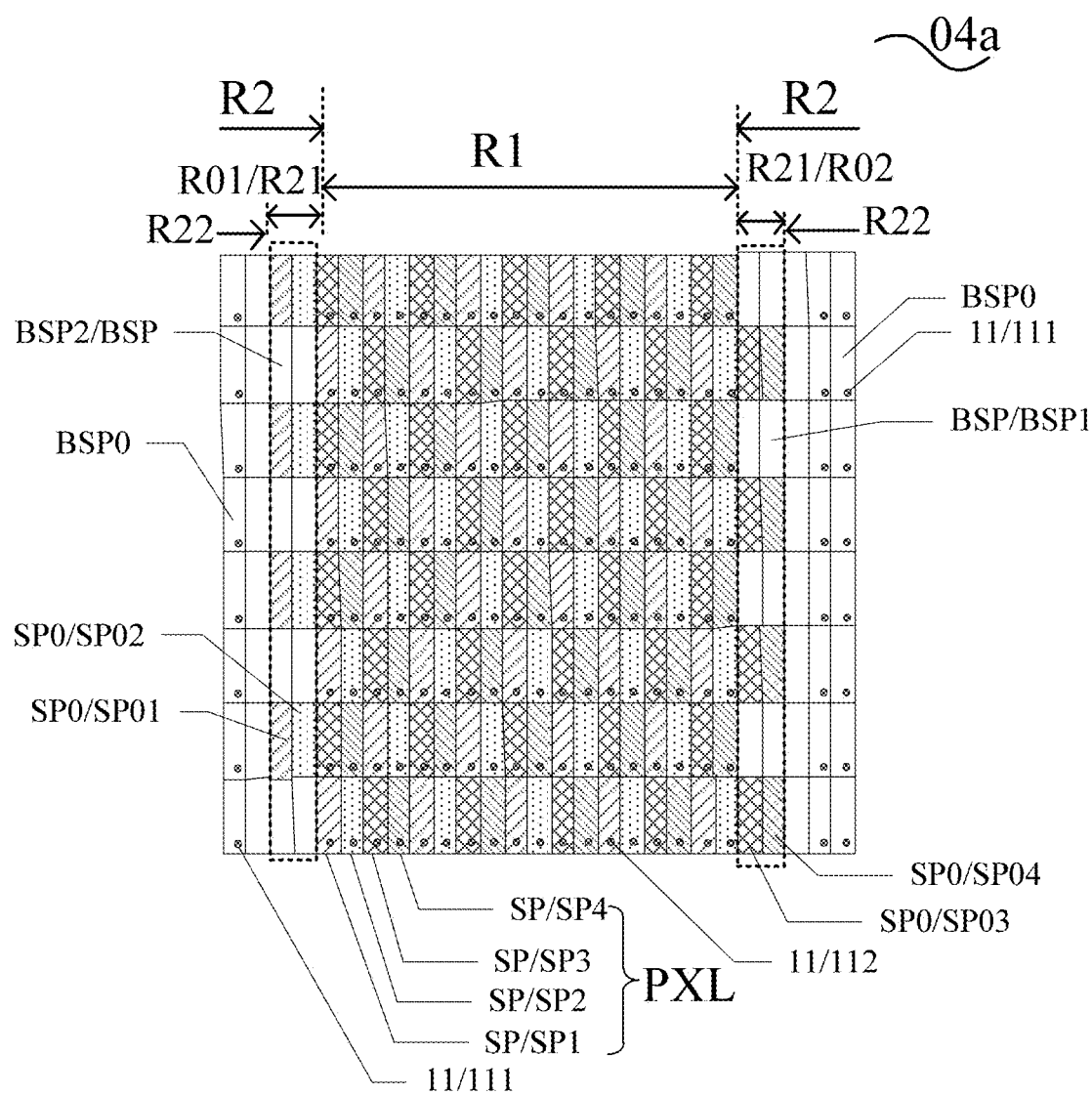
FIG. 8B is a plan view of a display substrate provided by another embodiment of the present disclosure.

As illustrated in FIG. 8A, the display substrate 03 includes a spacer 11, the spacer 11 includes a plurality of first spacers 111 located in the periphery region R2 and a plurality of second spacers 112 located in the display region R1. As illustrated in FIG. 8A, the spacer 11 has no overlap with the dummy sub-pixel SP0. The first spacer 111 has no overlap with the dummy sub-pixel SP0. The second spacer 112 has no overlap with the dummy sub-pixel SP0. For example, as illustrated in FIG. 8A, the first spacer 111 is only disposed in the edge region R22. The first spacer 111 is not disposed in the dummy region R21. As illustrated in FIG. 8A, the edge region R22 includes a plurality of blank region sub-pixels BSP0, each of the blank region sub-pixels BSP0 has an overlap with one first spacer 111, and one column of blank region sub-pixels BSP0 closest to the dummy region R21 has an overlap with the first spacer 111 to improve the supporting effect acted on the cell gap by the spacer. FIG. 8B is a plan view of a display substrate provided by another embodiment of the present disclosure. Compared with the display substrate 04 illustrated in FIG. 8A, in the display substrate 04a illustrated in FIG. 8B, one column of blank region sub-pixels BSP0 closest to the dummy region R21 has no overlap with the first spacer 111, that is, the second spacer 112 in the display region R1 and the first spacer 111 located in the edge region R22 at one side of the display region R1 are spaced apart by three display sub-pixels. For example, the second spacer 112 in the display region R1 and the first spacer 111 located in the edge region R22 at one side of the display region R1 are spaced apart by three columns without providing any spacer. Under such circumstance, the mask for fabricating the spacer may not be replaced so as to lower the cost. For example, the spacer in the display substrate 04a illustrated in FIG. 8B may be fabricated by using the mask M12 or the mask M23.

Figure 9:
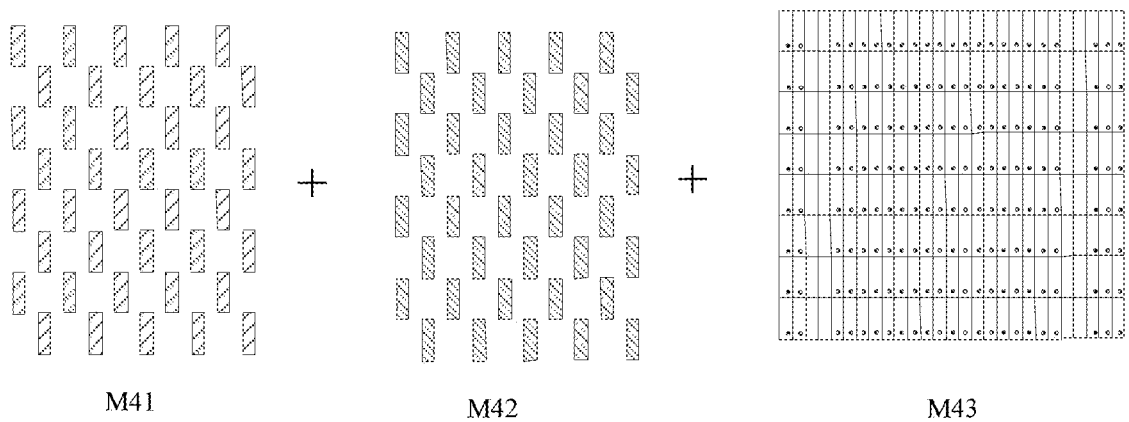
FIG. 9 is a schematic diagram of a mask for forming the display substrate illustrated in FIG. 8A, as provided by an embodiment of the present disclosure.

FIG. 9 is a schematic diagram of a mask for forming the display substrate illustrated in FIG. 8A, as provided by an embodiment of the present disclosure. FIG. 9 illustrates a mask M41, a mask M42, and a mask M43.

The display sub-pixel SP and the dummy sub-pixel SP0 may be formed by using the mask M41 in a manner of translationally shifting the mask M41. The mask M41 illustrated in FIG. 9 may be used for three different patterning processes to form the first display sub-pixel SP1, the second display sub-pixel SP2, and the third display sub-pixel SP3 in the display substrate illustrated in FIG. 8A, respectively. Furthermore, the first dummy sub-pixel SP01 is formed in a patterning process of forming the first display sub-pixel SP1; the second dummy sub-pixel SP02 is formed in a patterning process of forming the second display sub-pixel SP2; and the third dummy sub-pixel SP03 is formed in a patterning process of forming the third display sub-pixel SP3. For example, the manufacturing method of the display substrate illustrated in FIG. 8A includes: forming a first display sub-pixel SP1 and a first dummy sub-pixel SP01 in a first patterning process by using the mask M41; shifting the mask M41 to the right by a distance of one sub-pixel; forming a second display sub-pixel SP2 and a second dummy sub-pixel SP02 in a second patterning process by using the mask M41; shifting the mask M41 to the right, again, by a distance of one sub-pixel; and forming a third display sub-pixel SP3 and a third dummy sub-pixel SP03 in a third patterning process by using the mask M41.

For example, the manufacturing method of the display substrate illustrated in FIG. 8A further includes: forming a fourth display sub-pixel SP4 and a fourth dummy sub-pixel SP04 in the same patterning process by using the mask M42.

For example, the manufacturing method of the display substrate illustrated in FIG. 8A further includes: forming a spacer 11 in a patterning process by using the mask M43. The spacer 11 includes a first spacer 111 located in the periphery region R2 and a second spacer 112 located in the display region R1. The first spacer 111 and the second spacer 112 may be formed by using the same mask.

Figure 10:
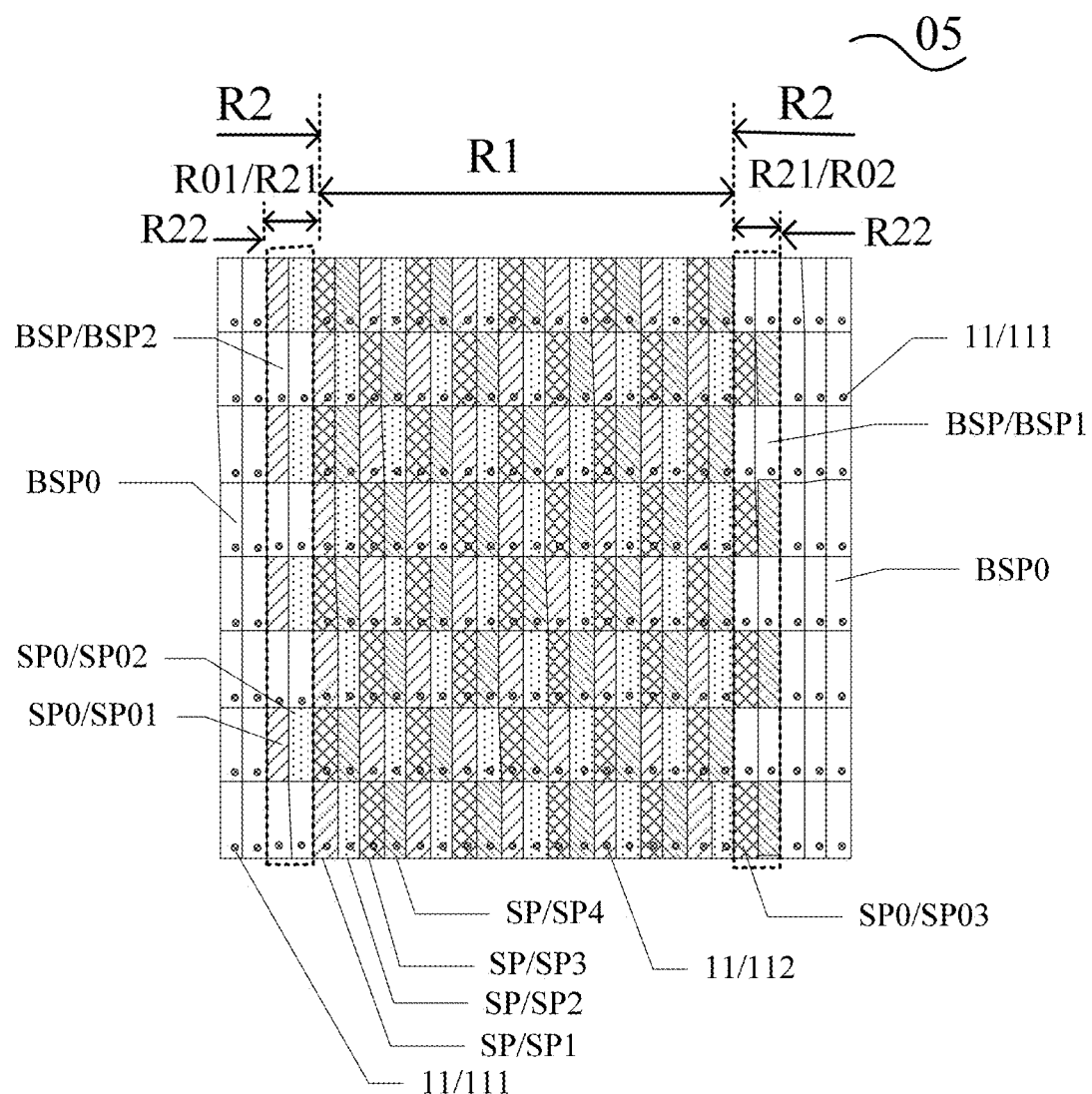
FIG. 10 is a plan view of a display substrate provided by another embodiment of the present disclosure.

FIG. 10 is a plan view of a display substrate provided by another embodiment of the present disclosure. Compared with the display substrate 04 illustrated in FIG. 8A, in the display substrate 05 illustrated in FIG. 10, a plurality of first spacers 111 is disposed in the dummy region R21 and in the edge region R22, and the plurality of first spacers 111 have an overlap with the blank sub-pixel BSP located in the dummy region R21. Similarly, the plurality of first spacers 111 have no overlap with the dummy sub-pixel SP0. The manufacturing method of the display substrate 05 illustrated in FIG. 10 is similar to the manufacturing method of the display substrate 04 illustrated in FIG. 8A with the difference that, when fabricating the spacer 11, it needs to replace the mask M43 by a mask for fabricating the spacer illustrated in FIG. 10.

The display substrate 03 illustrated in FIG. 6, the display substrate 04 illustrated in FIG. 8A, the display substrate 04a illustrated in FIG. 8B, and the display substrate 05 illustrated in FIG. 10 each are such a display substrate that the white sub-pixel occupies one quarter of each pixel. That is, one pixel includes four sub-pixels of different colors, and the four sub-pixels of different colors include one white sub-pixel.

Figure 11:
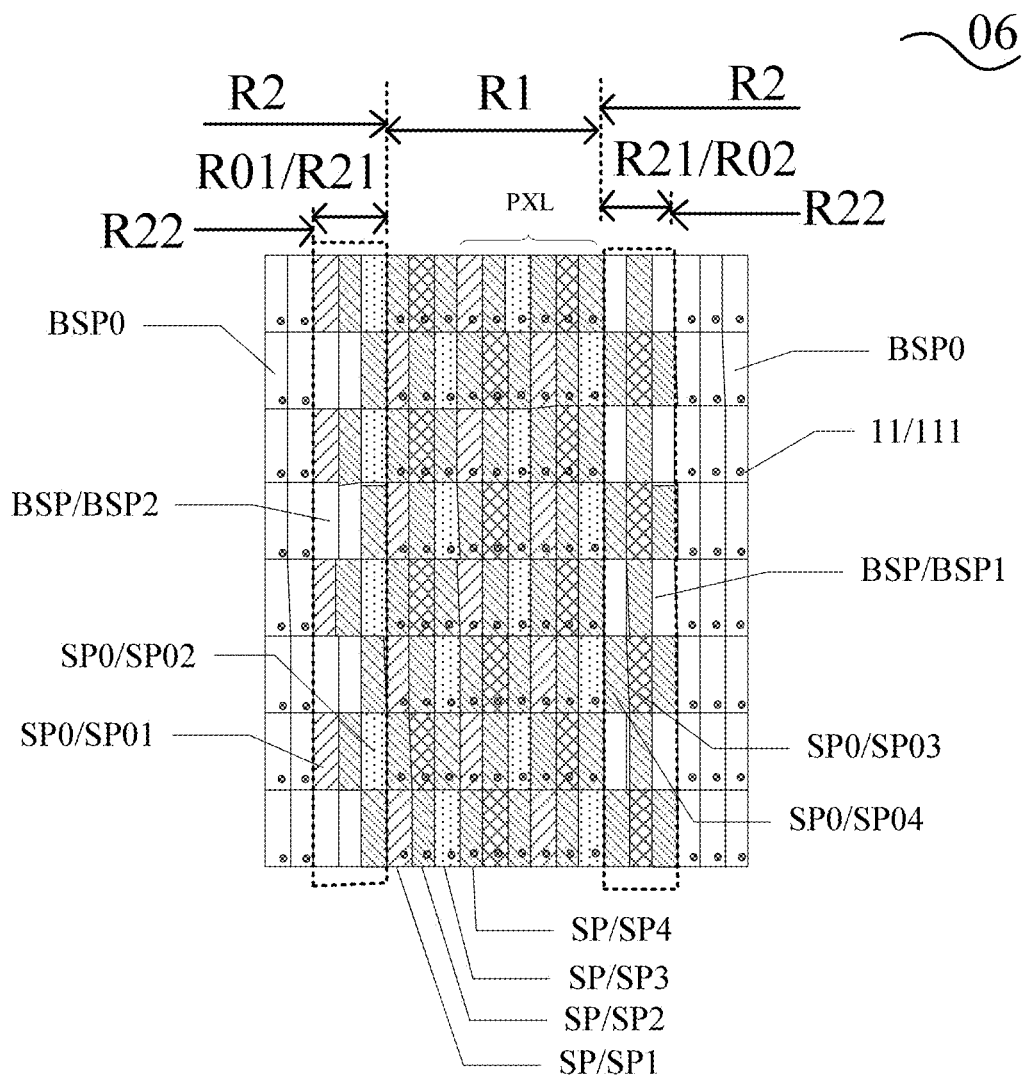
FIG. 11 is a plan view of a display substrate provided by another embodiment of the present disclosure.

FIG. 11 is a plan view of a display substrate provided by another embodiment of the present disclosure. The display substrate 06 illustrated in FIG. 11 is such a display substrate that the white sub-pixels occupy one half of each pixel. That is, the number of the white sub-pixel included in one pixel occupies one half of the number of the sub-pixels. As illustrated in FIG. 11, one pixel includes six sub-pixels, the six sub-pixels include three white sub-pixels, and the remaining three sub-pixels are sub-pixels of colors different from the white sub-pixels. For example, one pixel includes one red sub-pixel, one green sub-pixel, one blue sub-pixel and three white sub-pixels. The white sub-pixel may be located between adjacent two sub-pixels of other colors.

As illustrated in FIG. 11, in order to avoid the problem of side Mura, the plurality of first spacers 111 are only located in the edge region R22, and the dummy region R21 is not provided with the first spacer; that is, the plurality of first spacers 111 have no overlap with the dummy sub-pixel SP0.

As illustrated in FIG. 11, the dummy region R21 at each of two sides of the display region R1 includes three columns of dummy sub-pixels. As illustrated in the left side of FIG. 11, among the three columns of dummy sub-pixels: the white dummy sub-pixel SP04 and the green dummy sub-pixel SP02 in one column of dummy sub-pixels are arranged alternately; the white dummy sub-pixel SP04 and the blank sub-pixel BSP in one column of dummy sub-pixels are arranged alternately; the red dummy sub-pixel SP01 and the blank sub-pixel BSP in one column of dummy sub-pixels are arranged alternately. As illustrated in the right side of FIG. 11, among the three columns of dummy sub-pixels: the white dummy sub-pixel SP04 and the blue dummy sub-pixel SP03 in one column of dummy sub-pixels are arranged alternately; the white dummy sub-pixel SP04 and the blank sub-pixel BSP in the other two columns of dummy sub-pixels are arranged alternately.

Figure 12:
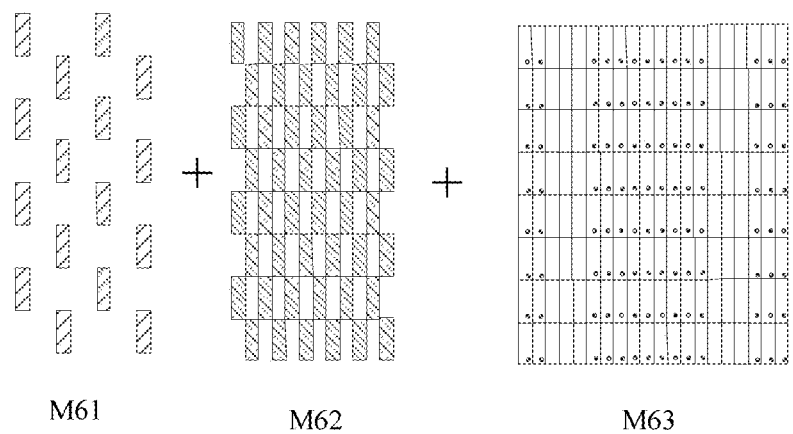
FIG. 12 is a schematic diagram of a mask for forming the display substrate illustrated in FIG. 11, as provided by an embodiment of the present disclosure.

FIG. 12 is a schematic diagram of a mask for forming the display substrate illustrated in FIG. 11 as provided by an embodiment of the present disclosure. FIG. 12 illustrates a mask M61, a mask M62, and a mask M63. The usage of the mask M61 may be referred to that of the mask M41 illustrated in FIG. 9, the usage of the mask M62 may be referred to that of the mask M42 illustrated in FIG. 9, and the usage of the mask M63 may be referred to that of the mask M43 illustrated in FIG. 9, without repeatedly described here. Compared with the manufacturing method of a conventional display substrate, during the manufacturing process of the display substrate illustrated in FIG. 11, the mask for forming the spacer may not be changed.

Figure 13:
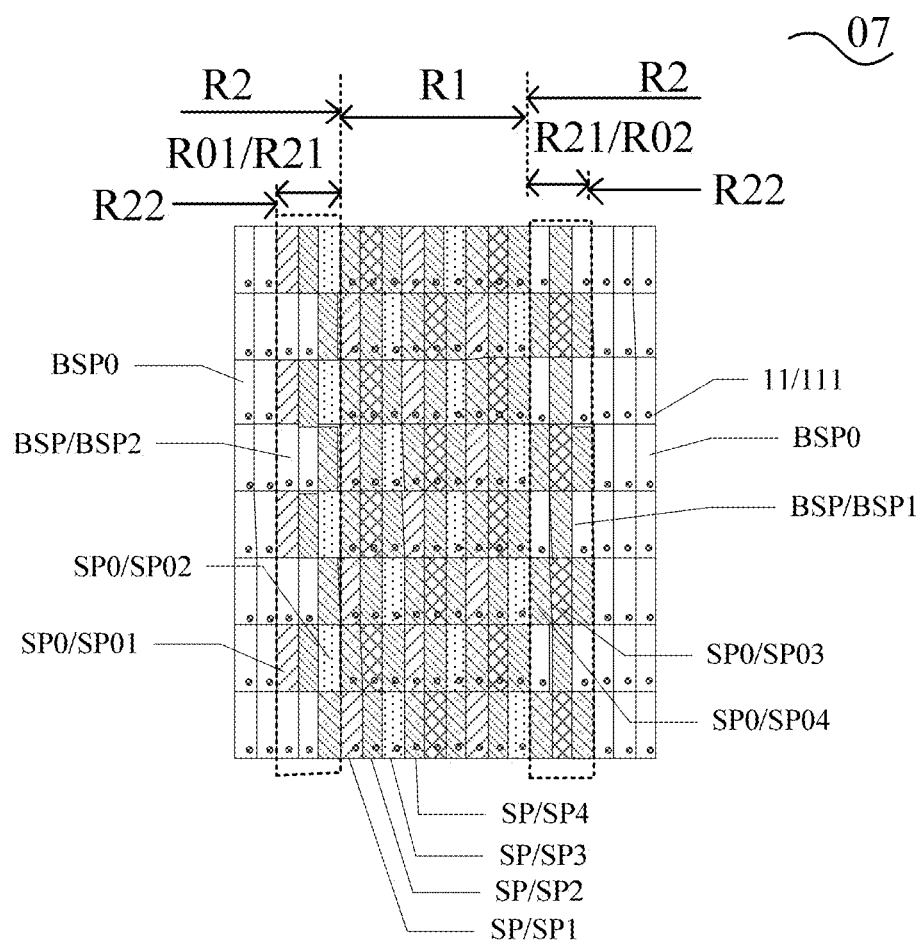
FIG. 13 is a plan view of a display substrate provided by another embodiment of the present disclosure.

FIG. 13 is a plan view of a display substrate provided by another embodiment of the present disclosure. Compared with the display substrate 06 illustrated in FIG. 11, in the display substrate 07 illustrated in FIG. 13, a plurality of first spacers 111 is located in the edge region R22 and in the dummy region R21, the first spacer 111 located in the dummy region R21 has an overlap with the blank sub-pixel BSP. As illustrated in FIG. 13, the plurality of first spacers 111 have no overlap with the dummy sub-pixel P0.

Figure 14:
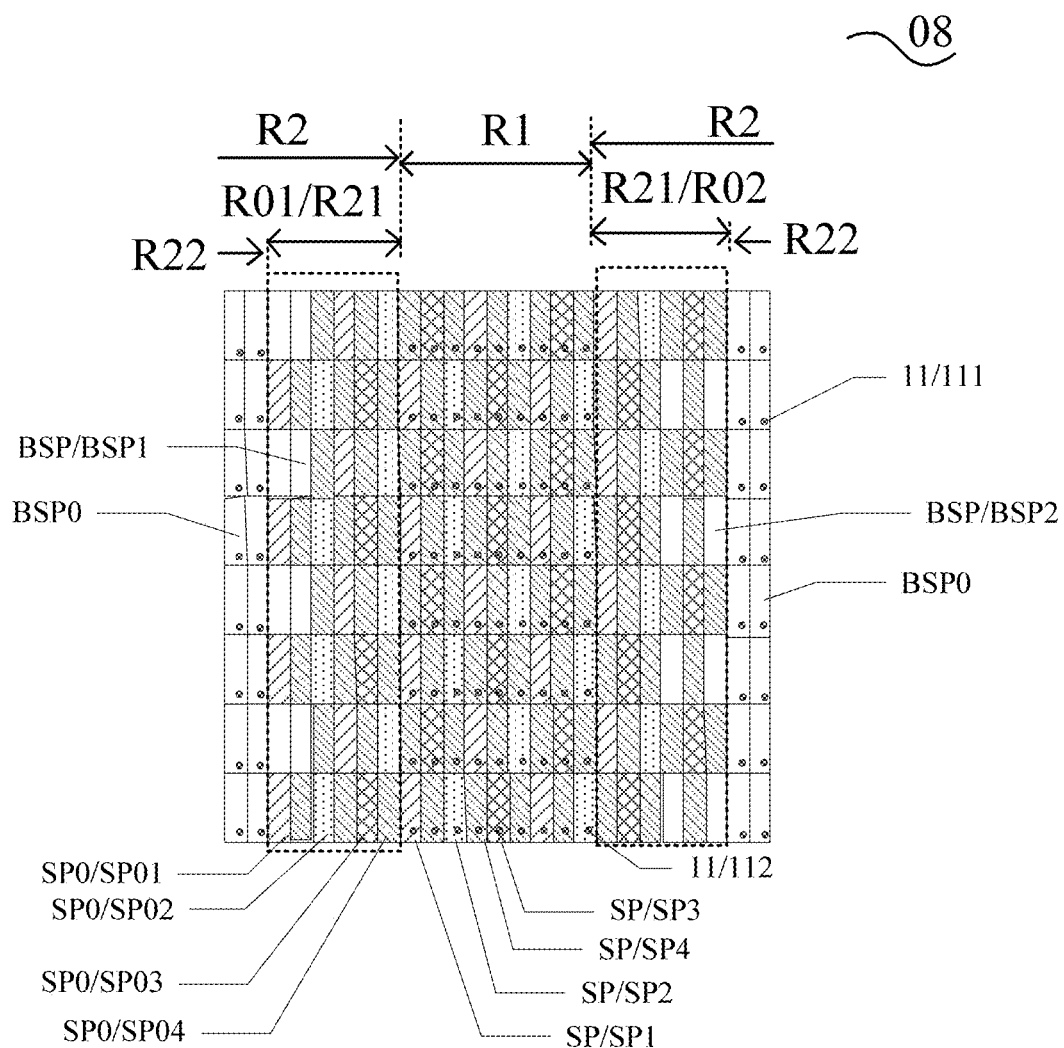
FIG. 14 is a plan view of a display substrate provided by another embodiment of the present disclosure.

FIG. 14 is a plan view of a display substrate provided by another embodiment of the present disclosure. Compared with the display substrate 06 illustrated in FIG. 11, in the display substrate 08 illustrated in FIG. 14, the dummy region R21 at each of two sides of the display region R1 includes six columns of dummy sub-pixels.

Figure 15:
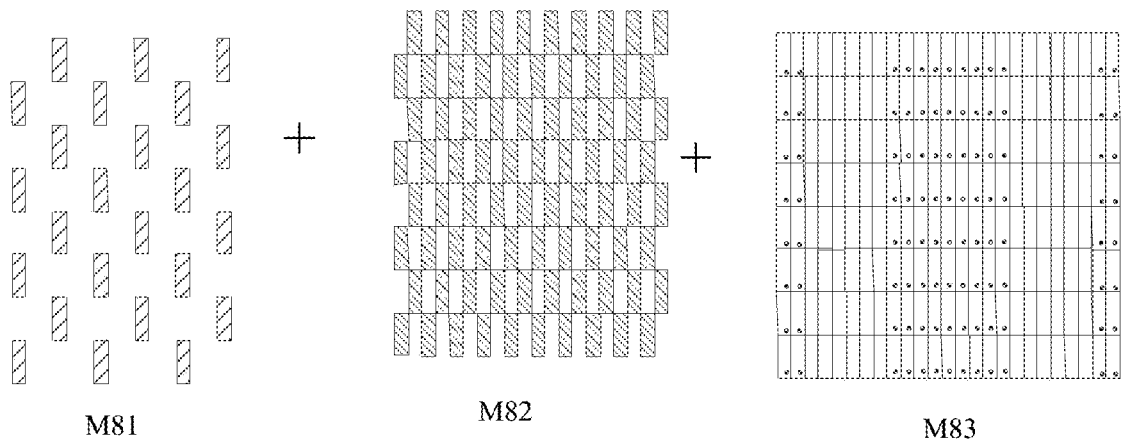
FIG. 15 is a schematic diagram of a mask for forming the display substrate illustrated in FIG. 14, as provided by an embodiment of the present disclosure.

FIG. 15 is a schematic diagram of a mask for forming the display substrate illustrated in FIG. 14 as provided by an embodiment of the present disclosure. FIG. 15 illustrates a mask M81, a mask M82, and a mask M83. The usage of the mask M81 may be referred to that of the mask M41 illustrated in FIG. 9, the usage of the mask M82 may be referred to that of the mask M42 illustrated in FIG. 9, and the usage of the mask M83 may be referred to that of the mask M43 illustrated in FIG. 9, without repeatedly described here.

Figure 16:
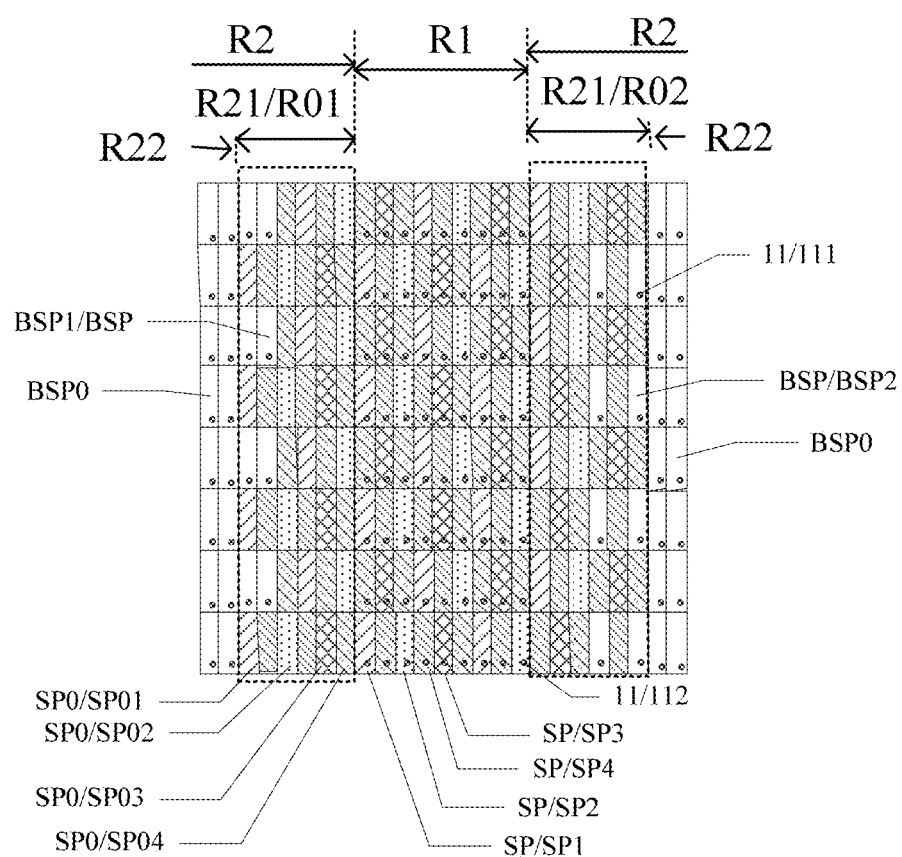
FIG. 16 is a plan view of a display substrate provided by another embodiment of the present disclosure.

FIG. 16 is a plan view of a display substrate provided by another embodiment of the present disclosure. Compared with the display substrate 08 illustrated in FIG. 14, in the display substrate 09 illustrated in FIG. 16, a plurality of first spacers 111 is located in the edge region R22 and in the dummy region R21, the first spacer 111 located in the dummy region R21 has an overlap with the blank sub-pixel BSP. As illustrated in FIG. 16, the plurality of first spacers 111 have no overlap with the dummy sub-pixel P0.

In the embodiment of the present disclosure, for the display substrate 06 illustrated in FIG. 11, the display substrate 07 illustrated in FIG. 13, the display substrate 08 illustrated in FIG. 14, and the display substrate 09 illustrated in FIG. 16, relatively more dummy sub-pixels SP0 are provided in the dummy region R21, so that a transition from the periphery region R2 to the display region R1 during coating an alignment layer can be achieved to facilitate an ordered orientation of liquid crystals and to improve the display quality at the periphery.

For example, as illustrated in FIG. 4, FIG. 6, FIG. 8A, FIG. 8B, FIG. 10, FIG. 11, FIG. 13, FIG. 14, and FIG. 16, the dummy region R21 includes a first dummy sub-region R01 and a second dummy sub-region R02 arranged at two opposite sides of the display region R01, respectively. For example, the portion of the dummy region R21 located at the left side of the figure is the first dummy sub-region R01, and the portion of the dummy region R21 located at the right side of the figure is the second dummy sub-region R02. The blank sub-pixel BSP includes a first blank sub-pixel BSP1 located in one of the first dummy sub-region R01 and the second dummy sub-region R02, and a second blank sub-pixel BSP2 located in the other one of the first dummy sub-region R01 and the second dummy sub-region R02; the first blank sub-pixel BSP1 and the second blank sub-pixel BSP2 are located in different rows.

For example, one of the first blank sub-pixel BSP1 and the second blank sub-pixel BSP2 is located in an even-numbered row, and the other one of the first blank sub-pixel BSP1 and the second blank sub-pixel BSP2 is located in an odd-numbered row.

For example, as illustrated in FIG. 8A, FIG. 8B, FIG. 11, and FIG. 14, a plurality of first spacers 111 is only located in the edge region.

For example, as illustrated in FIG. 4, FIG. 6, FIG. 10, FIG. 13, and FIG. 16, a plurality of first spacers 111 is located in the dummy region R21 and in the edge region R22; an orthographic projection of the first spacer 111 located in the dummy region R21 on the first base substrate BS1 has an overlap with an orthographic projection of the blank sub-pixel BSP on the first base substrate BS1.

For example, as illustrated in FIG. 8A, FIG. 8B, and FIG. 10, the first dummy sub-region R01 and the second dummy sub-region R02 each include two columns of dummy sub-pixels; in the first dummy sub-region R01, one of an odd-numbered row and an even-numbered row includes one first dummy sub-pixel SP01 and one second dummy sub-pixel SP02, and the other one of an odd-numbered row and an even-numbered row includes two blank sub-pixels BSP; in the second dummy sub-region R02, one of an odd-numbered row and an even-numbered row includes one third dummy sub-pixel SP03 and one fourth dummy sub-pixel SP04, and the other one of an odd-numbered row and an even-numbered row includes two blank sub-pixels BSP.

For example, as illustrated in FIG. 11 and FIG. 13, the first dummy sub-region R01 and the second dummy sub-region R02 each include three columns of dummy sub-pixels; in the first dummy sub-region R01, one of an odd-numbered row and an even-numbered row includes one first dummy sub-pixel SP01, one second dummy sub-pixel SP02, and one fourth dummy sub-pixel SP04, and the other one of an odd-numbered row and an even-numbered row includes one fourth dummy sub-pixel SP04 and two blank sub-pixels BSP; in the second dummy sub-region R02, one of an odd-numbered row and an even-numbered row includes one third dummy sub-pixel SP03 and two fourth dummy sub-pixels SP04, and the other one of an odd-numbered row and an even-numbered row includes one fourth dummy sub-pixel SP04 and two blank sub-pixels BSP.

For example, as illustrated in FIG. 4 and FIG. 6, the first dummy sub-region R01 and the second dummy sub-region R02 each include five columns of dummy sub-pixels; in the first dummy sub-region R01, one of an odd-numbered row and an even-numbered row includes two first dummy sub-pixels SP01, one second dummy sub-pixel SP02, one third dummy sub-pixel SP03, and one fourth dummy sub-pixel SP04, and the other one of an odd-numbered row and an even-numbered row includes one first dummy sub-pixel SP01, one second dummy sub-pixel SP02, one third dummy sub-pixel SP03, and two blank sub-pixels BSP; in the second dummy sub-region R02, one of an odd-numbered row and an even-numbered row includes one first dummy sub-pixel SP01, one second dummy sub-pixel SP02, one third dummy sub-pixel SP03, and two fourth dummy sub-pixels SP04, and the other one of an odd-numbered row and an even-numbered row includes one first dummy sub-pixel SP01, one second dummy sub-pixel SP02, one third dummy sub-pixel SP03, and two blank sub-pixels BSP.

For example, as illustrated in FIG. 14 and FIG. 16, the first dummy sub-region R01 and the second dummy sub-region R02 each include six columns of dummy sub-pixels; in the first dummy sub-region R01, one of an odd-numbered row and an even-numbered row includes one first dummy sub-pixel SP01, one second dummy sub-pixel SP02, one third dummy sub-pixel SP03, and three fourth dummy sub-pixels SP04, and the other one of an odd-numbered row and an even-numbered row includes one first dummy sub-pixel SP01, one second dummy sub-pixel SP02, two fourth dummy sub-pixels SP04, and two blank sub-pixels BSP; in the second dummy sub-region R02, one of an odd-numbered row and an even-numbered row includes one first dummy sub-pixel SP01, one second dummy sub-pixel SP02, one third dummy sub-pixel SP03 and three fourth dummy sub-pixels SP04, and the other one of an odd-numbered row and an even-numbered row includes one third dummy sub-pixel SP03, three fourth dummy sub-pixels SP04, and two blank sub-pixels BSP.

At least one embodiment of the present disclosure further provides a display panel including the display substrate described in any of the above.

Figure 17:
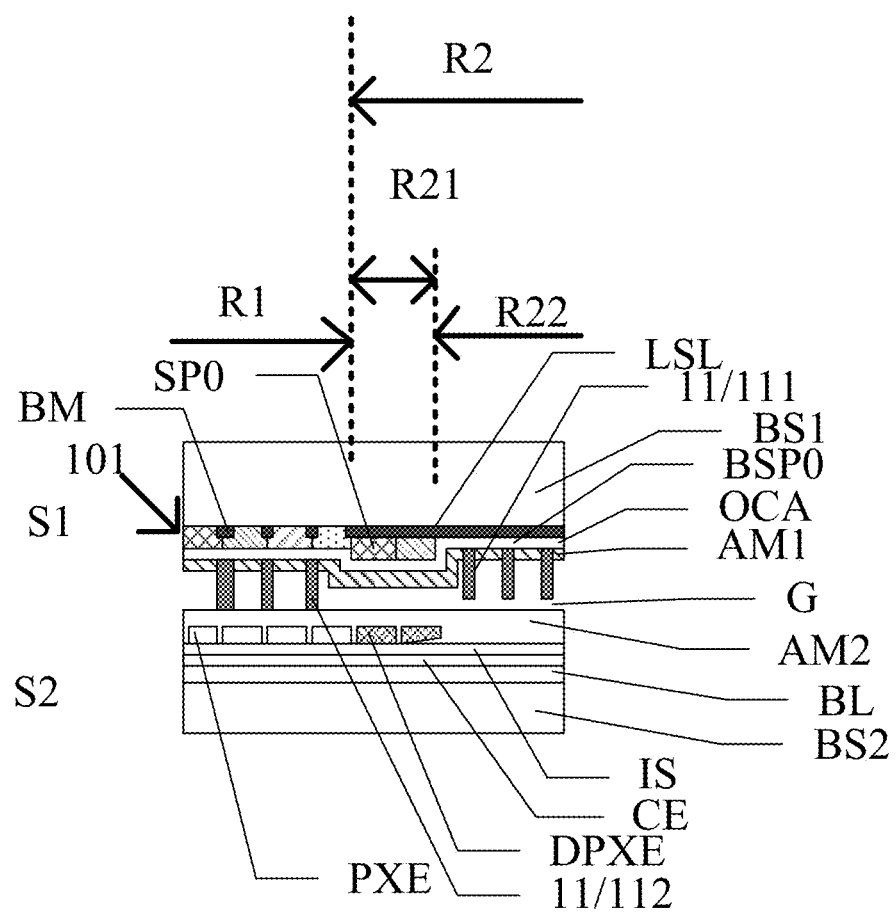
FIG. 17 is a partial cross-sectional view (for example, a cross-sectional view taken along A-B of FIG. 8A) of a display panel provided by an embodiment of the present disclosure.

FIG. 17 is a partial cross-sectional view of a display panel provided by an embodiment of the present disclosure. As illustrated in FIG. 17, the display panel includes an array substrate S2 and an opposed substrate S1 that are arranged opposite to each other. As illustrated in FIG. 17, the opposed substrate S1 includes a first base substrate BS1, and a black matrix BM and a light-shielding layer LSL that are located on the first base substrate BS1; the black matrix BM and the light-shielding layer LSL may be formed from the same film layer by using the same patterning process, and may be formed in the same layer. The black matrix BM is located in the display region R1, and the light-shielding layer LSL is located in the periphery region R2. After the black matrix BM and the light-shielding layer LSL are formed, a display sub-pixel SP is formed in the display region R1, and a dummy sub-pixel SP0 is formed in the dummy region R21. Then an optical clear adhesive layer OCA is coated. A spacer 11 is formed on the optical clear adhesive layer OCA. As illustrated in FIG. 17, after the spacer 11 is formed, a first alignment layer AM1 is formed. As illustrated in FIG. 17, a first spacer 111 is formed in the edge region R22, and a second spacer 112 is formed in the display region RE As illustrated in FIG. 17, the first spacer 111 and the second spacer 112 have the same size in a direction perpendicular to the first base substrate BS1. For example, a gap G is provided between the first spacer 111 and the array substrate S2. As illustrated in FIG. 17, the first spacer 111 is not in contact with the array substrate S2, so that an influence on display by the second spacer in the periphery region R2 can be avoided and hence the problem of side Mura can be avoided. For example, as illustrated in FIG. 17, the second spacer 112 is in contact with the array substrate S2. As illustrated in FIG. 17, the first spacer 111 has no overlap with the dummy sub-pixel SP0 so as to avoid the problem of side Mura.

As illustrated in FIG. 17, the array substrate S2 includes a second base substrate BS2 and a buffer layer BL located on the second base substrate BS2; a common electrode CE is disposed on the buffer layer BL, an insulating layer IS is disposed on the common electrode CE, a plurality of pixel electrodes PXE insulated from each other are disposed on the insulating layer IS, and a second alignment layer AM2 is disposed on the plurality of pixel electrodes PXE insulated from each other.

As illustrated in FIG. 17, an orthographic projection of the display sub-pixel SP on the first base substrate BS1 has an overlap with an orthographic projection of the pixel electrode PXE on the first base substrate BS1. An orthographic projection of the dummy sub-pixel SP0 on the first base substrate BS1 has no overlap with the orthographic projection of the pixel electrode PXE on the first base substrate BS1. An orthographic projection of the blank sub-pixel BSP on the first base substrate BS1 has no overlap with the orthographic projection of the pixel electrode PXE on the first base substrate BS1.

As illustrated in FIG. 17, the first spacer 111 has an overlap with the light-shielding layer LSL. The second spacer 112 has an overlap with the black matrix BM. The second spacer 112 has no overlap with the light-shielding layer LSL.

Figure 18:
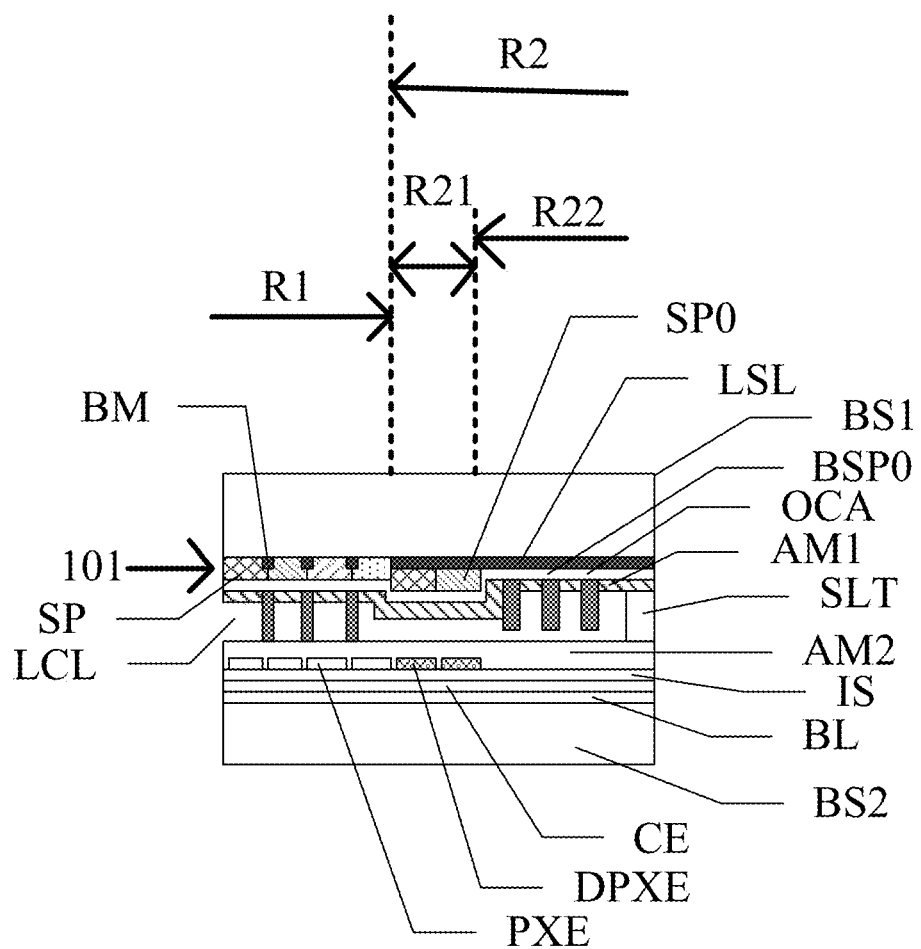
FIG. 18 is a partial cross-sectional view (for example, a cross-sectional view taken along C-D of FIG. 8A) of a display panel provided by an embodiment of the present disclosure.

FIG. 18 is a partial cross-sectional view of a display panel provided by an embodiment of the present disclosure. The display substrate illustrated in FIG. 18 is different from the display substrate illustrated in FIG. 17 in that, the display substrate illustrated in FIG. 18 illustrates a sealant SLT through which the array substrate S2 and the opposed substrate S1 are assembled and sealed into a cell, and a liquid crystal layer LCL is disposed in the cell.

As illustrated in FIG. 17 and FIG. 18, the display substrate further includes a dummy pixel electrode DPXE. The dummy pixel electrode DPXE corresponds to the dummy sub-pixel SP0. The dummy pixel electrode DPXE is a floating electrode, that is, no signal is applied to the dummy pixel electrode DPXE. The dummy pixel electrode DPXE and the pixel electrode PXE are formed from the same film layer by using the same patterning process, and the arrangement of the dummy pixel electrode DPXE is for the purpose of obtaining uniform pixel electrode PXE. As illustrated in FIG. 17 and FIG. 18, an orthographic projection of the dummy pixel electrode DPXE on the first base substrate BS1 is located within an orthographic projection of the light-shielding layer LSL on the first base substrate BS1. The orthographic projection of the dummy pixel electrode DPXE on the first base substrate BS1 has no overlap with an orthographic projection of the black matrix BM on the first base substrate BS1.

For example, as illustrated in FIG. 18, the dummy sub-pixel SP0 is shielded by the light-shielding layer LSL. The display sub-pixel SP is not shielded by the light-shielding layer LSL. An orthographic projection of the display sub-pixel SP on the first base substrate BS1 has an overlap with an orthographic projection of the black matrix BM on the first base substrate BS1.

Figure 19:
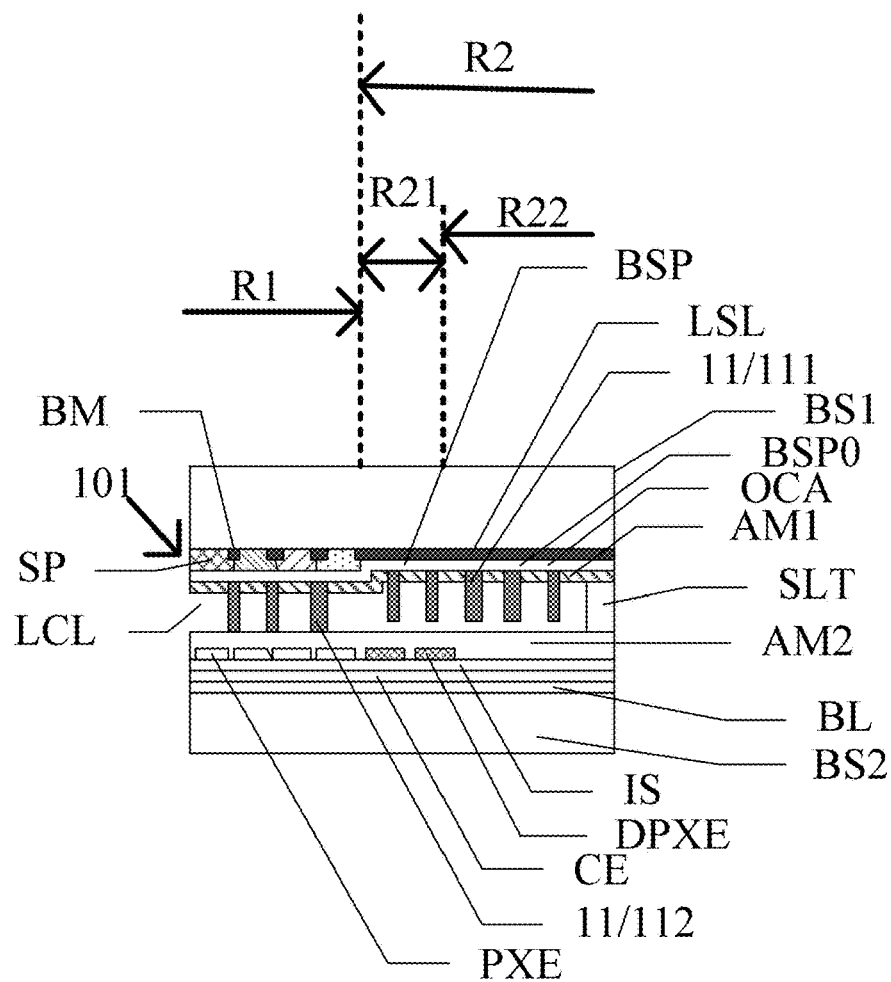
FIG. 19 is a partial cross-sectional view of a display panel provided by another embodiment of the present disclosure.

FIG. 19 is a partial cross-sectional view of a display panel provided by another embodiment of the present disclosure. FIG. 19 illustrates a blank sub-pixel BSP in the dummy region R21, and a first spacer 111 overlapped with the blank sub-pixel BSP. The first spacer 111 located in the periphery region R2 has the same height as the second spacer 112 located in the display region RE That is, the first spacer 111 located in the periphery region R2 and the second spacer 112 located in the display region R1 have the same size in a direction perpendicular to the first base substrate BS1.

For example, as illustrated in FIG. 19, the blank sub-pixel BSP located in the dummy region R21 is shielded by the light-shielding layer LSL. As illustrated in FIG. 19, the blank region sub-pixel BSP0 located in the edge region R22 is shielded by the light-shielding layer LSL.

For example, as illustrated in FIGS. 17-19, the first spacer 111 and the second spacer 112 have the same size in a direction perpendicular to the first base substrate BS1. A distance from a surface of the first spacer 111 away from the first base substrate BS1 to the first base substrate BS1 is smaller than a distance from a surface of the second spacer 112 away from the first base substrate BS1 to the first base substrate BS1.

For example, as illustrated in FIGS. 17-19, an optical clear adhesive layer OCA covers the display sub-pixel SP and the dummy sub-pixel SP0.

For example, as illustrated in FIGS. 17-19, an orthographic projection of the first spacer 111 on the first base substrate BS1 is located within an orthographic projection of the light-shielding layer LSL on the first base substrate BS1; and an orthographic projection of the second spacer 112 on the first base substrate BS1 is located within an orthographic projection of the black matrix BM on the first base substrate BS1.

For example, as illustrated in FIGS. 17-19, the first alignment layer AM1 is located on the first base substrate BS1, and the first alignment layer AM1 covers the display sub-pixel SP and the dummy sub-pixel SP0.

Figure 20:
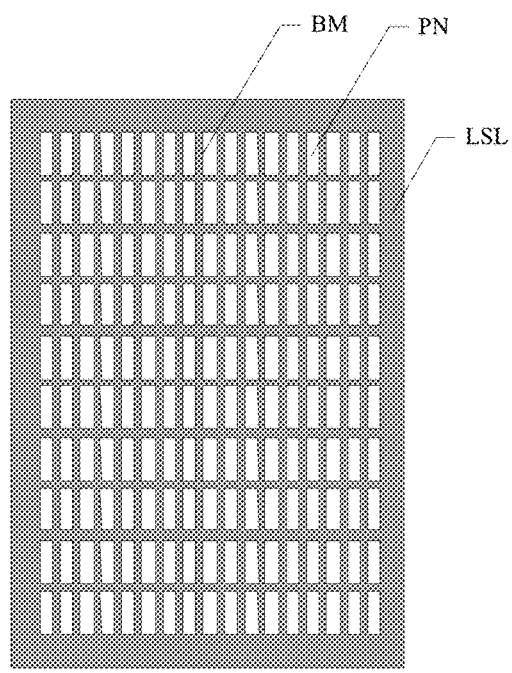
FIG. 20 is a schematic diagram of a black matrix and a light-shielding layer in a display substrate provided by an embodiment of the present disclosure.

FIG. 20 is a schematic diagram of a black matrix and a light-shielding layer in a display substrate provided by an embodiment of the present disclosure. As illustrated in FIG. 20, the black matrix BM and the light-shielding layer LSL are formed in the same layer, and the light-shielding layer LSL surrounds the black matrix BM. As illustrated in FIG. 20, the black matrix BM includes a plurality of openings PN. For example, each of the openings may correspond to one display sub-pixel SP.

Figure 21:
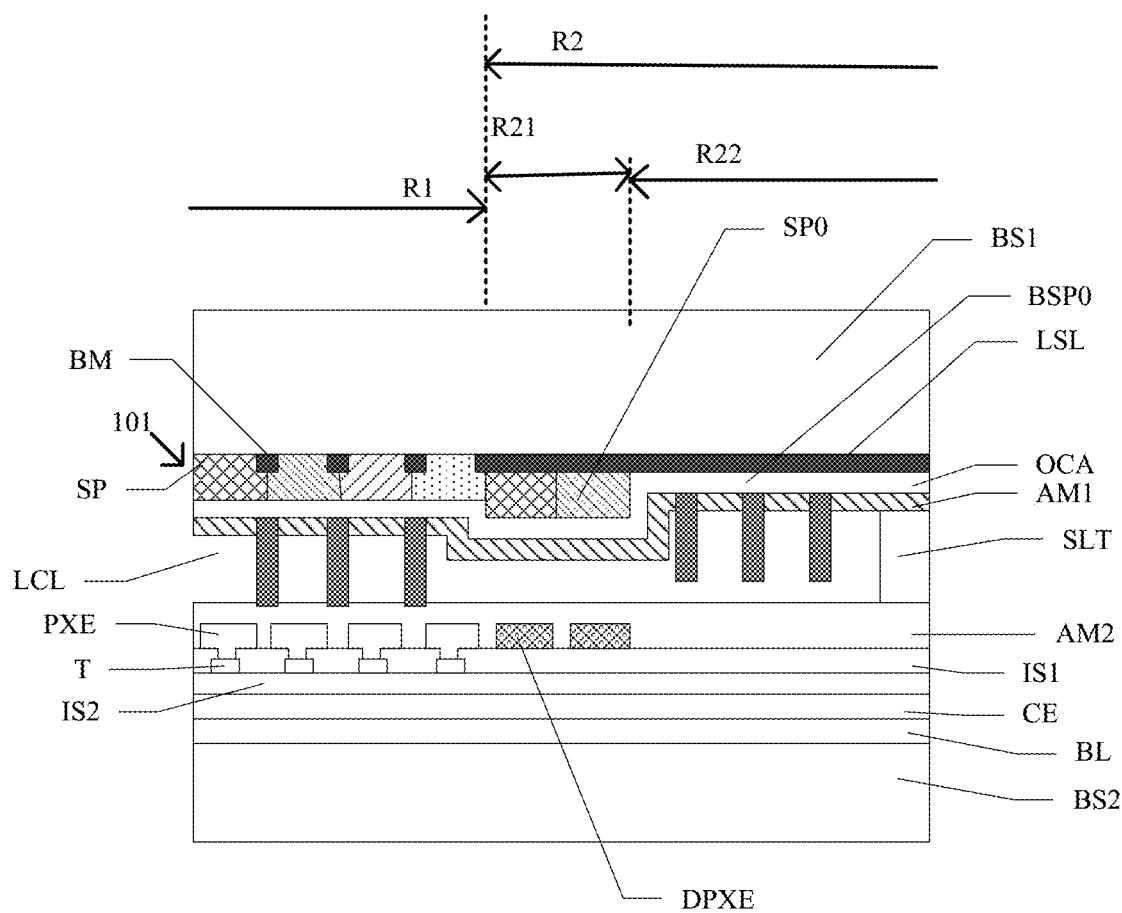
FIG. 21 is a schematic diagram of a display substrate provided by an embodiment of the present disclosure.

FIG. 21 is a schematic diagram of a display substrate provided by an embodiment of the present disclosure. Compared with the display substrate illustrated in FIG. 18, the display substrate illustrated in FIG. 21 illustrates a thin film transistor T, and the pixel electrode PXE is connected with the thin film transistor T to control the sub-pixel to be turned on and turned off. Each of the pixel electrodes PXE may be individually controlled. For example, the sub-pixel includes a display sub-pixel and a pixel electrode PXE. A first insulating layer IS1 is provided between the pixel electrode PXE and the thin film transistor T, and a second insulating layer IS2 is provided between the thin film transistor T and the common electrode CE. For example, the pixel electrode PXE is connected with a drain electrode of the thin film transistor T.

As illustrated in FIG. 21, a portion of the first insulating layer IS1 located right below the dummy pixel electrode DPXE is not provided with a via hole so that the dummy pixel electrode DPXE is floated. In FIG. 21, no thin film transistor T is disposed below the dummy pixel electrode DPXE; in other embodiments, a thin film transistor T may be disposed below the dummy pixel electrode DPXE, as long as the dummy pixel electrode DPXE is not connected with the thin film transistor T. For example, as illustrated in FIGS. 17-19 and FIG. 21, the plurality of pixel electrodes PXE are insulated from each other, and the pixel electrode PXE and the dummy pixel electrode DPXE are insulated from each other. For example, the pixel electrode PXE and the dummy pixel electrode DPXE are formed from the same film layer by using the same patterning process. For example, the pixel electrode PXE and the dummy pixel electrode DPXE are formed by using a transparent conductive material, and the transparent conductive material includes tin indium oxide (ITO), without limited thereto.

In the embodiments of the present disclosure, the common electrode CE and the pixel electrode PXE are disposed on the second base substrate BS2, so as to form a liquid crystal display device of an Advanced super Dimension Switch (ADS) mode or a High Advanced Super Dimension Switch (HADS) mode. One of the common electrode CE and the pixel electrode PXE that is closer to the liquid crystal layer LCL may adopt a slit electrode to control liquid crystal molecules in the liquid crystal layer LCL to rotate. It should be explained that, the mode of the liquid crystal display device is not limited to the ADS mode or HADS mode, and the common electrode CE may also be disposed on the second base substrate BS2.

In the embodiments of the present disclosure, for example, as illustrated in FIG. 4, FIG. 6, FIG. 8A, FIG. 8B, FIG. 10, FIG. 11, FIG. 13, FIG. 14, FIG. 16, FIG. 17, FIG. 18, FIG. 19 and FIG. 21, the edge region R22 is provided with a blank region sub-pixel BSP0, and the blank region sub-pixel BSP0 in the edge region R22 has no overlap with the plurality of pixel electrodes PXE in a direction perpendicular to the first base substrate BS1. That is, an orthographic projection of the blank region sub-pixel BSP0 in the edge region R22 on the first base substrate BS1 has no overlap with orthographic projections of the plurality of pixel electrodes PXE on the first base substrate BS1. For example, the blank region sub-pixel BSP0 in the edge region R22 has no overlap with the plurality of dummy pixel electrodes DPXE in a direction perpendicular to the first base substrate BS1. That is, the orthographic projection of the blank region sub-pixel BSP0 in the edge region R22 on the first base substrate BS1 has no overlap with orthographic projections of the plurality of dummy pixel electrodes DPXE on the first base substrate BS1. The blank region sub-pixel BSP0 in the edge region R22 may have a structure as same as that of the blank sub-pixel BSP in the dummy region R21.

In the embodiment of the present disclosure, a position of the display sub-pixel SP0 may allow light to transmit; however, because the dummy pixel electrode DPXE in the periphery region R2 is floated and the periphery region R2 is provided with the light-shielding layer LSL, positions at the dummy sub-pixel SP0 in the periphery region R2 and at the blank sub-pixel BSP in the periphery region R2 do not allow light to transmit.

For example, in the embodiment of the present disclosure, the first display sub-pixel transmits light of a first color, the second display sub-pixel transmits light of a second color, the third display sub-pixel transmits light of a third color, and the fourth display sub-pixel transmits light of a fourth color. The first display sub-pixel, the second display sub-pixel, the third display sub-pixel, and the fourth display sub-pixel emit light having colors different from each other. For example, the light of first color is red light, the light of second color is green light, the light of third color is blue light, and the light of fourth color is white light, without limited thereto.

For example, as illustrated in FIGS. 17-19 and FIG. 21, a color filter layer 101 includes a display sub-pixel SP located in the display region R1 and a dummy sub-pixel SP0 located in the periphery region R2. The color filter layer 101 is hollowed-out at a position of the blank sub-pixel BSP. The color filter layer 101 is hollowed-out at a position of the blank region sub-pixel BSP0.

For example, in the embodiment of the present disclosure, the first display sub-pixel, the second display sub-pixel, and the third display sub-pixel each include a resin material and a corresponding dyestuff or fluorescent substance, so as to emit light of different colors. The fourth display sub-pixel may include a resin material but includes no dyestuff or fluorescent substance, so as to emit white light. The blank sub-pixel includes no resin material for forming the color filter layer 101. The blank sub-pixel in the dummy region has an overlap with the dummy pixel electrode DPXE, and the blank sub-pixel in the edge region has no overlap with the dummy pixel electrode DPXE.

For example, in the embodiment of the present disclosure, the first dummy sub-pixel SP01, the second dummy sub-pixel SP02, the third dummy sub-pixel SP03, and the fourth dummy sub-pixel SP04 are formed of materials as same as those of the first display sub-pixel SP1, the second display sub-pixel SP2, the third display sub-pixel SP3, and the fourth display sub-pixel SP4, respectively. That is, the first dummy sub-pixel SP01 and the first display sub-pixel SP1 are formed by the same material; the second dummy sub-pixel SP02 and the second display sub-pixel SP2 are formed by the same material; the third dummy sub-pixel SP03 and the third display sub-pixel SP3 are formed by the same material; and the fourth dummy sub-pixel SP04 and the fourth display sub-pixel SP4 are formed by the same material.

In the embodiment of the present disclosure, by sharing the mask, the cost of development is reduced; and by optimizing the design of the dummy sub-pixel or the first spacer 111 (dummy spacer), the problem of side Mura caused by an overlap between the dummy sub-pixel and the first spacer 111 can be avoided.

For example, in the embodiment of the present disclosure, in the case where the first display sub-pixel SP1 is red sub-pixel (R), the second display sub-pixel SP2 is green sub-pixel (G), the third display sub-pixel SP3 is blue sub-pixel (B), and the fourth display sub-pixel SP4 is white sub-pixel (W), the pixels on the display substrate illustrated in FIG. 4, FIG. 6, FIG. 8A, FIG. 8B and FIG. 10 are arranged in RGBW mode. For example, the first display sub-pixel, the second display sub-pixel, the third display sub-pixel, and the fourth display sub-pixel are arranged sequentially along a first direction and constitute one pixel; two pixels adjacent in a second direction are staggered in the first direction by a distance of two display sub-pixels; the first direction is intersected with the second direction. For example, the first direction is a row direction, and the second direction is a column direction. For example, the first direction is perpendicular to the second direction, without limited thereto. For example, FIG. 8A schematically illustrates a pixel PXL.

For example, in the embodiment of the present disclosure, in the case where the first display sub-pixel SP1 is red sub-pixel (R), the second display sub-pixel SP2 is green sub-pixel (G), the third display sub-pixel SP3 is blue sub-pixel (B), and the fourth display sub-pixel SP4 is white sub-pixel (W), the pixels on the display substrate illustrated in FIG. 11, FIG. 13, FIG. 14, FIG. 16, FIG. 17, FIG. 18, FIG. 19 and FIG. 21 are arranged in RWGWBW mode. For example, one first display sub-pixel, one fourth display sub-pixel, one second display sub-pixel, one fourth display sub-pixel, one third display sub-pixel and one fourth display sub-pixel are arranged sequentially along a first direction and constitute one pixel; two pixels adjacent in a second direction are staggered in the first direction by a distance of three display sub-pixels; the first direction is intersected with the second direction. For example, the first direction is a row direction, and the second direction is a column direction. For example, the first direction is perpendicular to the second direction, without limited thereto. For example, FIG. 11 schematically illustrates a pixel PXL.

Another embodiment of the present disclosure further provides a display device, including the display substrate described in any of the above. The display device may include a liquid crystal display device and any product or component that includes a liquid crystal display device and has display function such as a television, a digital camera, a mobile phone, a watch, a tablet computer, a notebook computer, and a navigator.

It should be explained that, for purpose of clarity, in the drawings for describing the embodiments of the present disclosure, the thickness of a layer or a region is enlarged. It's understandable that, when an element such as a layer, a film, a region and a substrate is referred to as being located "on" or "below" another element, the element may be "directly" located "on" or "below" another element, or an intermediate element may be provided.

For example, in the embodiments of the present disclosure, two elements have no overlap refers to that orthographic projections of the two elements on the first base substrate have no overlap.

In the embodiments of the present disclosure, the shape of each of the elements is merely described by way of example, and is not limited to that illustrated in the figures but may be determined according to requirements.

In the embodiments of the present disclosure, the patterning or patterning process may only include a photolithographic process, or may include the photolithographic process and an etching process, or may include other process(es) for forming a predetermined pattern such as a printing process and an ink-jetting process. The photolithographic process refers to a process which includes steps of film forming, exposing and developing and which forms a pattern by utilizing a photoresist, a mask, an exposure machine and the like. A corresponding patterning process may be selected according to the structure(s) to be formed in the embodiments of the present disclosure.

In case of no conflict, the features in the same embodiment or in different embodiments can be combined with each other.

What have been described above are only specific implementations of the present disclosure, but the protection scope of the present disclosure is not limited thereto. All the changes or substitutions easily conceivable for any skilled who is familiar with the present technical field should be covered by the protection scope of the present disclosure. Therefore, the protection scope of the present disclosure should be based on the protection scope of the claims.

What is claimed is:

1. A display substrate, comprising:
   a color filter layer, comprising a display sub-pixel and a dummy sub-pixel, the display sub-pixel being located in a display region of a first base substrate, the display sub-pixel comprising a first display sub-pixel, a second display sub-pixel, a third display sub-pixel, and a fourth display sub-pixel, colors of emitted light of the first display sub-pixel, the second display sub-pixel, the third display sub-pixel, and the fourth display sub-pixel being different from each other; the dummy sub-pixel being located in a periphery region of the first base substrate, the periphery region being at least located at one side of the display region, the periphery region comprising a dummy region close to the display region and an edge region away from the display region, the dummy sub-pixel being located in the dummy region, the dummy sub-pixel comprising a first dummy sub-pixel, a second dummy sub-pixel, a third dummy sub-pixel, and a fourth dummy sub-pixel, materials of the first dummy sub-pixel, the second dummy sub-pixel, the third dummy sub-pixel, and the fourth dummy sub-pixel being the same as materials of the first display sub-pixel, the second display sub-pixel, the third display sub-pixel and the fourth display sub-pixel, respectively; and a spacer, comprising a plurality of first spacers and a plurality of second spacers, the plurality of first spacers being located in the periphery region, the plurality of second spacers being located in the display region, wherein an orthographic projection of each of the plurality of first spacers on the first base substrate has no overlap with an orthographic projection of the dummy sub-pixel on the first base substrate.

2. The display substrate according to claim 1, wherein the dummy region comprises a blank sub-pixel, the color filter layer is hollowed-out at a position of the blank sub-pixel, the dummy region comprises a first dummy sub-region and a second dummy sub-region located at two opposite sides of the display region, respectively, the blank sub-pixel comprises a first blank sub-pixel located in the first dummy sub-region and a second blank sub-pixel located in the second dummy sub-region, and the first blank sub-pixel and the second blank sub-pixel are located in different rows.

3. The display substrate according to claim 2, wherein one of the first blank sub-pixel and the second blank sub-pixel is located in an even-numbered row, and the other one of the first blank sub-pixel and the second blank sub-pixel is located in an odd-numbered row.

4. The display substrate according to claim 2, wherein the plurality of first spacers are only located in the edge region; or, the plurality of first spacers are located in the dummy region and in the edge region, an orthographic projection of the first spacer located in the dummy region on the first base substrate has an overlap with an orthographic projection of the blank sub-pixel on the first base substrate.

5. The display substrate according to claim 2, further comprising a black matrix and a light-shielding layer, wherein the black matrix and the light-shielding layer are located on the first base substrate, the black matrix is located in the display region, the light-shielding layer is located in the periphery region, an orthographic projection of the first spacer on the first base substrate is located within an orthographic projection of the light-shielding layer on the first base substrate, and an orthographic projection of the each of the plurality of second spacers on the first base substrate is located within an orthographic projection of the black matrix on the first base substrate.

6. The display substrate according to claim 2, wherein each of the first dummy sub-region and the second dummy sub-region comprises two columns of dummy sub-pixels; in the first dummy sub-region, one of an odd-numbered row and an even-numbered row comprises one first dummy sub-pixel and one second dummy sub-pixel, and the other one of the odd-numbered row and the even-numbered row comprises two blank sub-pixels; in the second dummy sub-region, one of an odd-numbered row and an even-numbered row comprises one third dummy sub-pixel and one fourth dummy sub-pixel, and the other one of the odd-numbered row and the even-numbered row comprises two blank sub-pixels.

7. The display substrate according to claim 6, wherein the first display sub-pixel, the second display sub-pixel, the third display sub-pixel, and the fourth display sub-pixel are arranged sequentially in a first direction and constitute one pixel, two pixels adjacent in a second direction are staggered in the first direction by a distance of two display sub-pixels, the first direction is intersected with the second direction.

8. The display substrate according to claim 6, wherein the edge region comprises a blank region sub-pixel, the color filter layer is hollowed-out at a position of the blank region sub-pixel; the second spacer located in the display region and the first spacer located in the edge region at one side of the display region are spaced apart by three display sub-pixels.

9. The display substrate according to claim 2, wherein each of the first dummy sub-region and the second dummy sub-region comprises three columns of dummy sub-pixels; in the first dummy sub-region, one of an odd-numbered row and an even-numbered row comprises one first dummy sub-pixel, one second dummy sub-pixel, and one third dummy sub-pixel, and the other one of the odd-numbered row and the even-numbered row comprises one fourth dummy sub-pixel and two blank sub-pixels; in the second dummy sub-region, one of an odd-numbered row and an even-numbered row comprises one third dummy sub-pixel and two fourth dummy sub-pixels, and the other one of the odd-numbered row and the even-numbered row comprises one fourth dummy sub-pixel and two blank sub-pixels.

10. The display substrate according to claim 2, wherein each of the first dummy sub-region and the second dummy sub-region comprises five columns of dummy sub-pixels; in the first dummy sub-region, one of an odd-numbered row and an even-numbered row comprises two first dummy sub-pixels, one second dummy sub-pixel, one third dummy sub-pixel, and one fourth dummy sub-pixel, and the other one of the odd-numbered row and the even-numbered row comprises one first dummy sub-pixel, one second dummy sub-pixel, one third dummy sub-pixel, and two blank sub-pixels; in the second dummy sub-region, one of an odd-numbered row and an even-numbered row comprises one first dummy sub-pixel, one second dummy sub-pixel, one third dummy sub-pixel, and two fourth dummy sub-pixels, and the other one of the odd-numbered row and the even-numbered row comprises one first dummy sub-pixel, one second dummy sub-pixel, one third dummy sub-pixel, and two blank sub-pixels.

11. The display substrate according to claim 2, wherein each of the first dummy sub-region and the second dummy sub-region comprises six columns of dummy sub-pixels; in the first dummy sub-region, one of an odd-numbered row and an even-numbered row comprises one first dummy sub-pixel, one second dummy sub-pixel, one third dummy sub-pixel, and three fourth dummy sub-pixels, and the other one of the odd-numbered row and the even-numbered row comprises one first dummy sub-pixel, one second dummy sub-pixel, two fourth dummy sub-pixels, and two blank sub-pixels; in the second dummy sub-region, one of an odd-numbered row and an even-numbered row comprises one first dummy sub-pixel, one second dummy sub-pixel, one third dummy sub-pixel, and three fourth dummy sub-pixels, and the other one of the odd-numbered row and the even-numbered row comprises one third dummy sub-pixel, three fourth dummy sub-pixels, and two blank sub-pixels.

12. The display substrate according to claim 1, wherein the first spacer and each of the plurality of second spacers have a same size in a direction perpendicular to the first base substrate, and a distance from a surface of the first spacer away from the first base substrate to the first base substrate is smaller than a distance from a surface of the second spacer away from the first base substrate to the first base substrate.

13. The display substrate according to claim 1, further comprising an optical clear adhesive layer located on the first base substrate, wherein the optical clear adhesive layer covers the display sub-pixel and the dummy sub-pixel.

14. The display substrate according to claim 1, further comprising a first alignment layer located on the first base substrate, wherein the first alignment layer covers the display sub-pixel and the dummy sub-pixel.

15. A display panel, comprising the display substrate according to claim 1.

16. The display panel according to claim 15, further comprising an array substrate, wherein the array substrate comprises a plurality of pixel electrodes, and the orthographic projection of the dummy sub-pixel on the first base substrate has no overlap with orthographic projections of the plurality of pixel electrodes on the first base substrate.

17. The display panel according to claim 16, wherein an orthographic projection of the display sub-pixel on the first base substrate has an overlap with an orthographic projection of one pixel electrode of the plurality of pixel electrodes on the first base substrate.

18. The display panel according to claim 16, wherein a gap is provided between the first spacer and the array substrate.

19. The display panel according to claim 16, wherein the plurality of second spacers are in contact with the array substrate.

20. A display device, comprising the display panel according to claim 15.

* * * * *